United States Patent [19]

Huza et al.

[11] Patent Number: 5,454,407
[45] Date of Patent: Oct. 3, 1995

[54] PNEUMATIC WAND APPARATUS AND METHOD

[75] Inventors: Mark Huza, Mount Vernon; Michael Pesce; Jack M. Olich, both of Mahopac, all of N.Y.

[73] Assignee: Diba Industries Inc., Danbury, Conn.

[21] Appl. No.: 244,329

[22] PCT Filed: Sep. 24, 1992

[86] PCT No.: PCT/US92/08099

§ 371 Date: Aug. 5, 1994

§ 102(e) Date: Aug. 5, 1994

[87] PCT Pub. No.: WO94/06686

PCT Pub. Date: Mar. 31, 1994

[51] Int. Cl.[6] .................................................. B65B 31/00
[52] U.S. Cl. ................... 141/10; 141/4; 141/67; 141/95; 141/114; 141/197; 141/313
[58] Field of Search .................... 141/4, 10, 65–68, 141/83, 94–96, 114, 192, 197, 285, 289, 290, 301, 302, 307, 312–314, 317; 417/43; 137/489, 492, 492.5

[56] References Cited

U.S. PATENT DOCUMENTS

| | | | |
|---|---|---|---|
| 3,810,262 | 5/1974 | Strand | 417/43 |
| 4,146,070 | 3/1979 | Angarola et al. | 141/68 |
| 4,702,287 | 10/1987 | Higbie et al. | 141/4 |
| 4,711,275 | 12/1987 | Ford et al. | 141/95 |
| 4,714,098 | 12/1987 | Stuckel | 141/197 |
| 4,862,912 | 9/1989 | Stonn et al. | 137/492.5 X |
| 4,872,492 | 10/1989 | McAnally et al. | 141/83 |
| 4,875,509 | 10/1989 | Da Silva | 141/83 |

Primary Examiner—J. Casimer Jacyna
Attorney, Agent, or Firm—Lowe, Price, LeBlanc & Becker

[57] ABSTRACT

Apparatus and method are provided for the essentially automatic filling with pressurized ambient air of non-elastic inflatable objects to predetermined overpressures; and operate through the creation and sensing of a fluidic effect in the inflatable object attendant the filling of the same, the discontinuation of that fluidic effect when the inflatable object has been filled to the predetermined overpressure, the sensing of the discontinuation of the fluidic effect and the discontinuation of the supply of pressurized air to the inflatable object in response thereto. Provisions are made for adjustment in the predetermined overpressure to which the inflatable object is filled, and for reversing the operation of the apparatus and method to deflate inflated objects for re-use. The apparatus and method are particularly adapted to the filling of non-elastic dunnage bags in situ in cargo shipping containers to protect shock sensitive cargoes, and to the deflation of the same at the point of cargo destination for economic dunnage bag re-use.

20 Claims, 11 Drawing Sheets

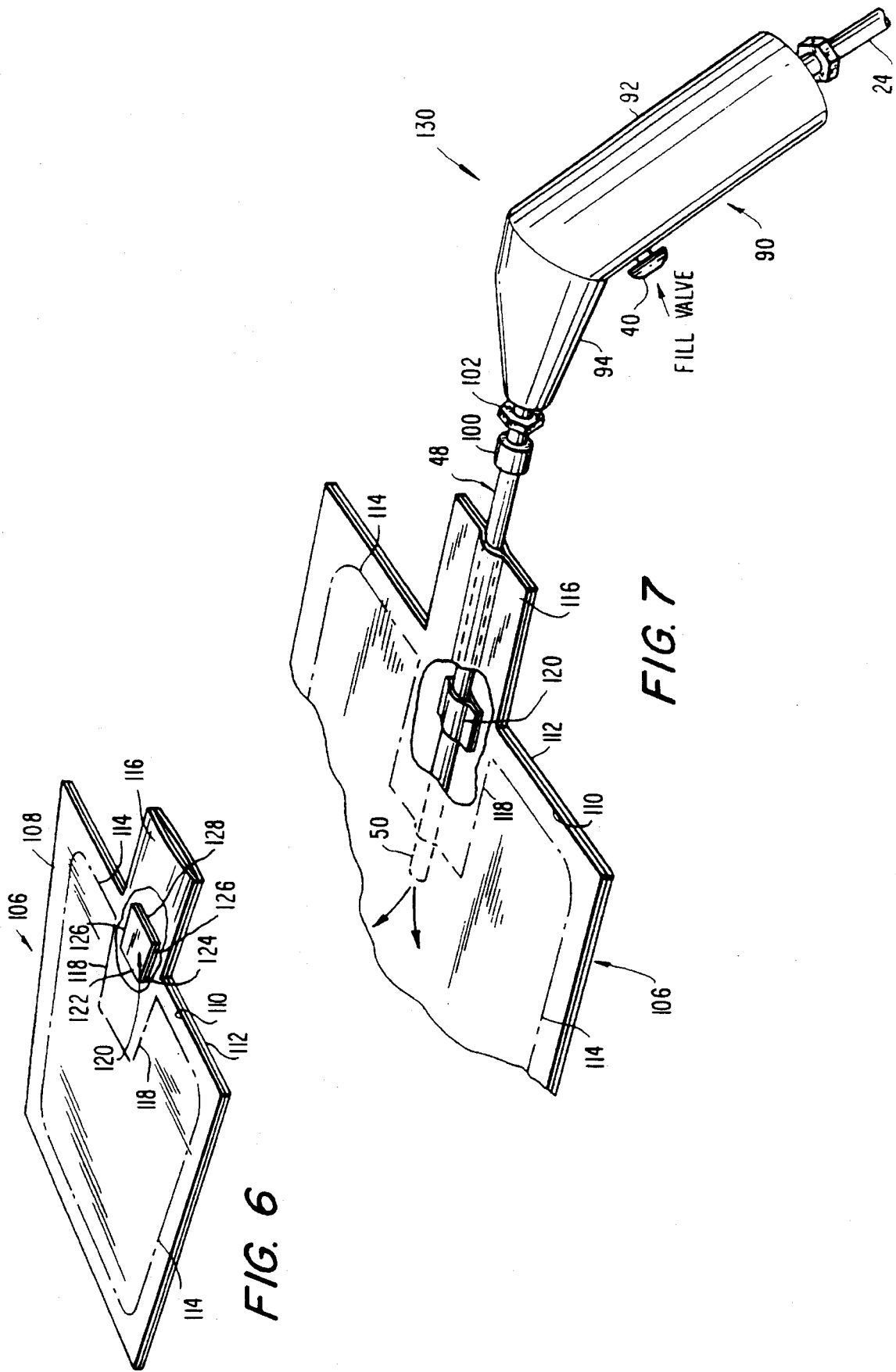

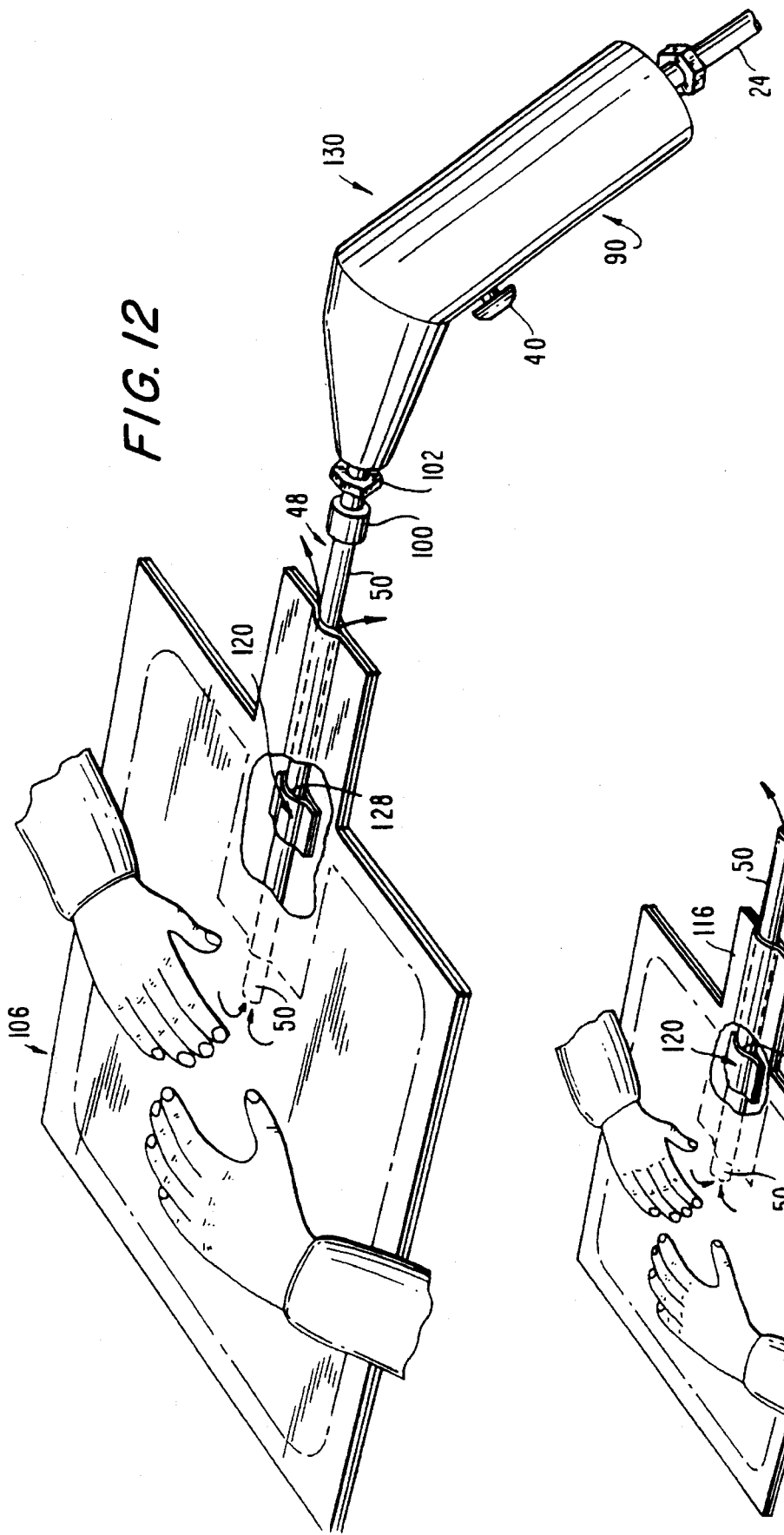

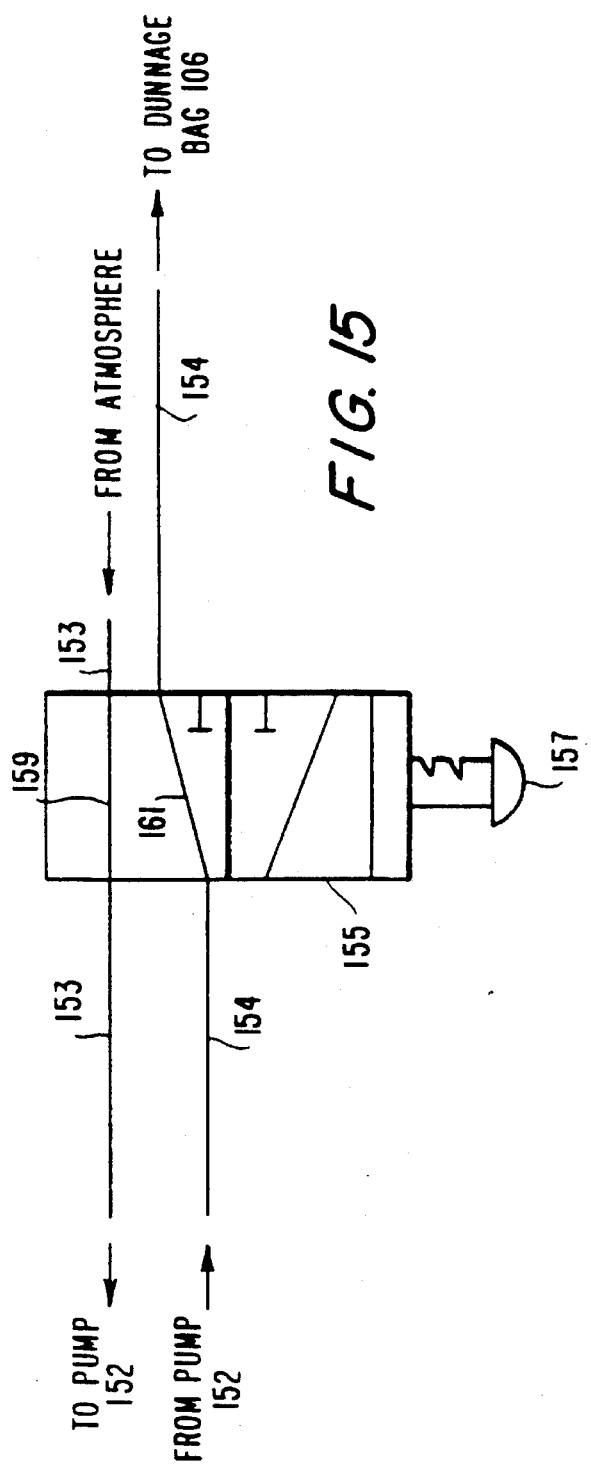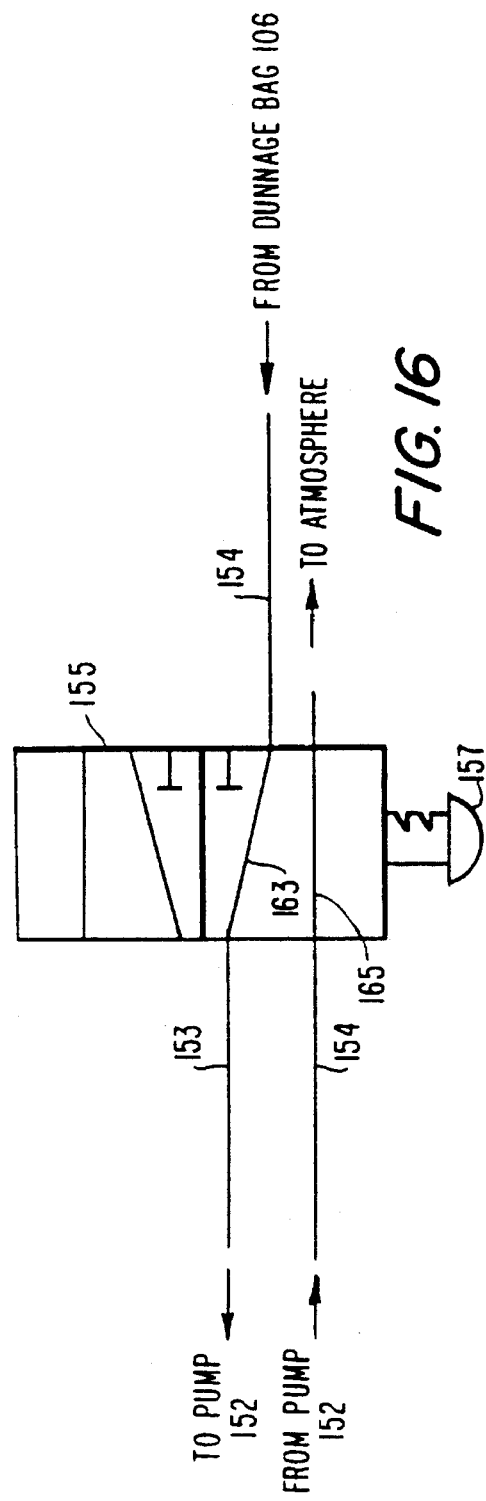

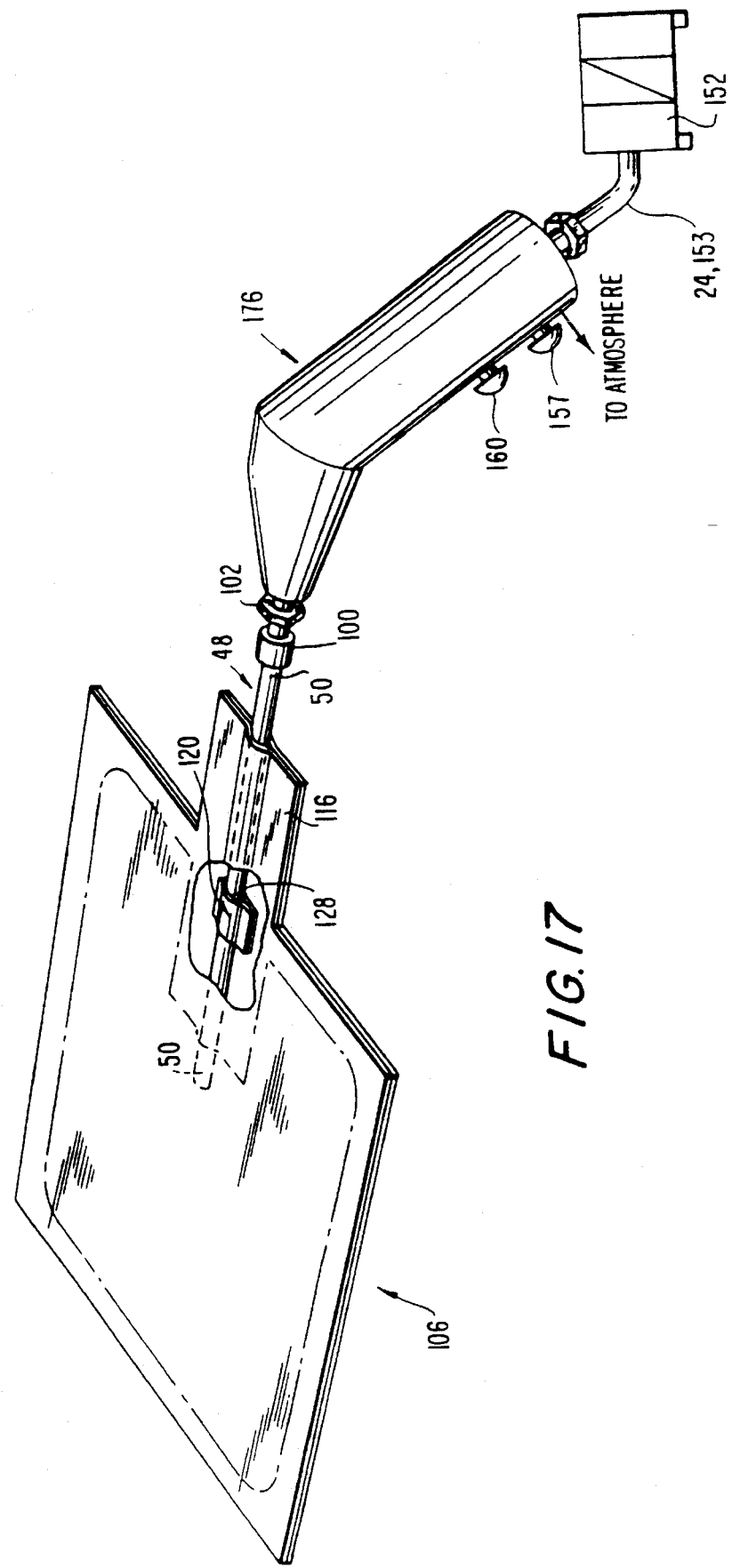

PNEUMATIC WAND APPARATUS AND METHOD

BACKGROUND OF THE INVENTION

1. Field of the Invention

This invention relates to new and improved pneumatic wand apparatus and method which are particularly adapted for hand-held use in the essentially automatic filling with ambient air of non-elastic dunnage bags to predetermined overpressures in situ in cargo containers.

2. Description of the Prior Art

Although prior art apparatus and methods are known for the filling of dunnage bags with ambient air, none are known which are configured and operable in the manner of those disclosed herein in accordance with the teaching of this invention, in particular with regard to the filling of dunnage bags to predetermined overpressures in situ in cargo containers.

More specifically, and considering first the Dunnage Bag Inflation Air Gun as disclosed in U.S. Pat. No. 4,146,070 to Angarola et al, the same will immediately be seen by those skilled in this art to take the form of a somewhat complex air injection device requiring a plurality of high pressure air fill orifices, and to be strictly limited in operation to use with dunnage bags which include a gun-compatible, highly specialized fill valve assembly, including a separately attachable fill valve assembly sealing member, the overall cost of which would most probably, as a practical cost matter, clearly rule out use of the Angarola air gun with contemporary dunnage bags, which are now being used in vastly increased quantities since the 1979 issue date of the Angarola patent, and which do not as a matter of economic practicality include such highly specialized and costly fill valve assemblies. The Angarola et al inflation gun operates through the entrainment of ambient air by high pressure air jets from the pressurized air fill orifices to force air through the fill valve assembly into the dunnage bag; and, upon filling of the dunnage bag to the specified maximum pressure level, simply dumps excess pressurized air back into the surrounding atmosphere, thus requiring reliance upon the skill and attention of the fill gun operator to detect this condition (see for example telltales 597 in Angarola's FIG. 21), discontinue pressurized air flow to the gun, remove the same from the dunnage bag fill valve assembly, and seal the same; it being noted that although Angarola et al do mention at lines 63–68 of patent specification column 9 that an automatic valve closure member could be employed to close the specialized dunnage bag fill valve upon sensing of a predetermined pressure in the dunnage bag, no specific disclosure of this feature is found in the patent. Under these circumstances, it should be immediately clear that the application of the Angarola et al air gun to the inflation of dunnage bags in situ in cargo containers would most probably be far less than practical, with the high pressure air being dumped from the gun upon bag filling quite possibly damaging or contaminating with dust sensitive cargo of the nature requiring dunnage bag protection, for example sophisticated electronic components or the like, and possibly presenting a safety hazard to the gun operator in violation of contemporary OSHA standards. In addition, the apparent need for precise alignment between the Angarola et al inflation gun and the specialized dunnage bag valve assembly would most probably render such task even more difficult in the somewhat cramped confines of a cargo container.

Referring next to the highly complex, and presumably inordinately expensive Ball Inflation Apparatus as disclosed in U.S. Pat. No. 4,714,098 to Stuckel, the same will immediately be seen to be directed to the inflation of elastic, rather than inelastic, objects, in particular vehicle tires, basketballs and footballs, although cushioning bags are also mentioned; with such elastic objects in any event of necessity comprising self-contained, specialized inflation valve assemblies which require a very small diameter, sharply pointed needle for insertion thereinto to inflate the object. To this effect, Stuckel includes a very small diameter, sharply pointed lubricated coaxial needle assembly which is operationally compatible with such inflation valve assemblies. In Stuckel, an external pneumatic pressure regulator is required to establish a set point for the pressure sensing function; while this prior art inflation apparatus further requires a total in all of at least seven pressure regulators and included gauges, a plurality of valves and connecting lines, and the like, a separate needle assembly lubrication system which includes a lubricating oil reservoir and needle lubrication line, and an output pressure reservoir tank; all to result as above in a highly complex, expensive, and clearly maintenance-prone device. In addition, and unlike the apparatus and method of the subject invention which function to fill non-elastic dunnage bags by essentially and simply sensing the fullness thereof, which is totally satisfactory to the purpose of the dunnage bag, the Stuckel Ball Inflation Apparatus functions to inflate elastic objects to a pre-set pressure and, as such and in accordance with the technological complexity thereof as above, would most probably represent technological overkill, so to speak, if attempts were made to apply the same to the task of this invention. Further, the operational necessity in Stuckel that the object to be inflated include the types of specialized fill valve assemblies commonly found in footballs, basketballs and vehicle tires would most probably, ab initio, disqualify the Stuckel apparatus for the filling of contemporary dunnage bags for the simple but obvious reason that the same, for cost considerations, do not include these types of specialized fill valve assemblies. In addition, it is not seen how the Stuckel Ball Inflation Apparatus could, in any event, as a practical matter be satisfactorily applied to the filling of dunnage bags in situ in a cargo container since some portion of the lubricating oil supplied to the coaxial inflation needle assembly would, as a virtual certainty, rub or be blown off the same with resultant contamination of the container cargo; while the sharpness of that needle assembly in the relatively cramped confines of a cargo container could very well result in the puncture of the dunnage bag by the same. Too, and to the extent made clear by the Stuckel disclosure, the Ball Inflation Apparatus thereof would by no means appear suitable to hand-held use within the confines of a cargo container. There is, in any event, no disclosure in Stuckel of the sensing of an abrupt change in the fluidic effect of the flow of the inflation air through the generation and use of negative pressure by a venturi at the tip of the Stuckel coaxial needle to sense the fullness of the object being inflated in accordance with the teachings of the subject invention; which teachings would not be technically relevant or operable in Stuckel wherein the pressure in the object being inflated is sensed through an orifice in the side of the coaxial needle without regard for the fluidic effect of inflation air flow at the needle tip, and wherein elastic objects are being inflated to a pre-set and quite substantial overpressure, for example 50 PSIG as would not be uncommon with certain types of vehicle tires, but would of course, immediately burst contemporary dunnage bags.

Referring next to the Automatic Nozzle disclosed in U.S.

Pat. No. 3,327,740 to Murray, and the Automatic Dispensing Nozzle disclosed in U.S. Pat. No. 3,312,257 to Knapp II, et al, these devices will immediately be seen to be limited to the automatic shut-off of the flow of gasoline to the gasoline tank of a motor vehicle in what has now become essentially conventional manner upon filling of the tank. Thus, and although this automatic shut-off of gasoline flow is accomplished in each instance by the sensing of the loss of an active vacuum signal generated by gasoline flow through the fill nozzle when the gasoline level blocks a venturi port, the same would clearly have absolutely no applicability to the filling of dunnage bags with air. In addition, there is, in any evnet, no provision for adjustability in these gasoline fill nozzles, in particular since gasoline is, of course, substantially incompressible; while the venturi effect in each of the same is created internally of the generally complex nozzle body assemblies rather than at the nozzle discharge tube.

Considering next the Pneumatic Amplifiers disclosed in U.S. Pat. No. 3,794,058 to Riley, and the Pneumatically Amplified Conservation Valve disclosed In U.S. Pat. No. 4,575,042 to Grimland et al, it will be immediately clear that although each of these devices does illustrate the by now generally well known concept of employing a pneumatic amplifier to generate an output signal to control a valve in response to the sensing of an externally generated input signal, there is nothing in either of these patent disclosures, which are respectively directed to the fluidic amplifier control of a proportional fluid valve and an oxygen conservation valve, to in any way suggest the application of the principles thereof to the control of filling of non-elastic dunnage bags with ambient air.

Considering lastly the Pressure Regulators disclosed in U.S. Pat. No. 3,805,823 to Kakegawa which illustrate pilot operated pressure regulators with a modulated main diaphragm to increase the accuracy of secondary pressure settings, with applications to both gas and liquid pressure regulation, it is clear that the same are of general interest only with regard to the subject matter here at hand in having no relevance or applicability to the filling of dunnage bags with ambient air.

OBJECTS OF THE INVENTION

It is, accordingly, an object of our invention to provide new and improved pneumatic wand apparatus and method for the essentially automatic filling to predetermined overpressure of non-elastic dunnage bags with ambient air.

It is another object of our invention to provide apparatus and method as above which are particularly adapted to the filling of non-elastic dunnage bags in situ in cargo containers.

It is another object of our invention to provide apparatus and method as above which are readily and immediately compatible with contemporary dunnage bags in requiring no specialized dunnage bag fill valve assemblies.

It is another object of our invention to provide apparatus and method as above which are operable through the sensing of an abrupt change in the fluidic effect of the flow of the inflation air into the dunnage bag at the tip of the inflation apparatus to very accurately sense the fullness of the dunnage bag to a desired overpressure and virtually immediately discontinue the further supply of pressurized air to the thusly filled dunnage bag.

It is another object of our invention to provide apparatus and method as above which are of particularly simple and virtually foolproof manner of operation, and which accordingly require a minimum of specialized skills and costly training of the like on the part of the operator for the satisfactory operation thereof, with attendant savings in operating labor costs.

It is another object of our invention to provide apparatus and method as above which are extremely rapid in operation in the filling of contemporary dunnage bags, to thus result in further savings in operating labor costs by increasing the number of such bags which can be filled per unit of operator time.

It is another object of our invention to provide apparatus and method as above with particularly low operating power requirements to thus result in further savings with regard to operating energy costs.

It is another object of our invention to provide apparatus and method as above which are particularly safe, quiet, and totally non-polluting in operation, to thus insure compliance thereof with all applicable contemporary OSHA and like worker safety and environmental requirements.

It is another object of our invention to provide apparatus and method as above which are readily and immediately adjustable, without requirement for tools or specialized training of any nature, in terms of the extent of the cushioning effect to be provided by the dunnage bags as filled thereby.

It is another object of our invention to provide apparatus and method as above which are consistently highly accurate in operation, without requirement for adjustment, despite the arbitrary volumes of dunnage bags as may be filled thereby.

It is another object of our invention to provide apparatus and method as above which function at operational pressure levels well below those approved by acceptable industry standards.

It is another object of our invention to provide apparatus and method as above which are embodied in a light weight stand-alone, readily manipulable hand-held unit which is ergonomically configured for ease of operator use to the task at hand.

It is another object of our invention to provide apparatus and method as above which are also particularly adapted to the rapid deflation of dunnage bags after initial use for convenient storage and subsequent re-use of the same to further significant economic advantage.

It is another object of our invention to provide apparatus and method as above which are of simple and straight forward design and configuration, and which require the use of only relatively inexpensive, off-the-shelf components of long proven dependability in the fabrication thereof, all to provide for relatively low unit apparatus costs, and long periods of satisfactory, essentially maintenance-free apparatus operation.

SUMMARY OF THE DISCLOSURE

As disclosed herein, the apparatus and method of the invention are embodied in a fluidic operating circuit which operates to supply pressurized ambient air from an appropriate source thereof taking the form of a pump to an inflatable object to rapidly fill the same to a desired overpressure. The pressurized air is supplied to the inflatable object through a wand which includes an annulus formed between coaxial inner and outer tubes having generally aligned tip portions which are inserted into the object to be filled to create a fluidic effect taking the form of a venturi with attendant negative pressure at the tip portion of the inner tube in response to pressurized air flow through the annulus. When the pressure in the inflatable object being filled reaches the predetermined overpressure, the venturi is stalled with resultant shift in the pressure at the tip portion of the inner tube from negative to positive; and this pressure shift is sensed by a fluidic amplifier to in turn shift the same from the "INPUT OFF" to "INPUT ON" conditions thereof. In a first disclosed embodiment, this shift in amplifier condition operates to close a pressure actuated valve to discontinue the further supply of pressurized air to the thusly inflated object; while, in a second disclosed embodiment, this shift in amplifier condition operates to close a pressure actuated switch to discontinue operation of the pump to like effect. Adjustment in the overpressure to which the inflatable object is filled is provided for by convenient adjustment in the alignment of the respective outer and inner tube tip portions to thereby adjust the overpressure in the object at which the venturi will stall. The second disclosed embodiment includes a selector valve which, in a first position thereof, connects the outlet of the pump to the inflatable object to supply pressurized air thereto to inflate the same and, in a second position thereof, connects the inlet of the pump to an inflated object to withdraw air therefrom and deflate the same for reuse. The apparatus and method of the invention are particularly adapted to the essentially automatic filling of non-elastic dunnage bags to desired overpressures in situ in cargo shipping container to protect shock sensitive cargoes during shipping, and to the deflation of those dunnage bags at the cargo shipping container destination for economic re-use.

DESCRIPTION OF THE DRAWINGS

The above and other objects and significant advantages of the apparatus and method of our invention are believed made clear by the following detailed description of the invention taken in conjunction with the accompanying drawings wherein:

FIG. 6 is a perspective view, with parts cut away for purposes of illustration, depicting a contemporary dunnage bag of the nature of those particularly adapted to be filled by the apparatus and method of our invention;

FIG. 7 is a perspective view, with parts cut away for purposes of illustration, depicting the operative connection of the apparatus of our invention to the dunnage bag of FIG. 6 for the filling of the latter;

FIG. 12 is a perspective view, with parts cut away for purposes of illustration, depicting the operative connection of the apparatus of our invention to the dunnage bag of FIG. 6 for the deflation of the latter;

FIG. 13 is a perspective view, with parts cut away for purposes of illustration, depicting the operative connection of one of the tubes of the wand assembly of the operating circuit of FIG. 1 to the dunnage bag of FIG. 6 for the deflation of the latter;

FIG. 15 is a schematic diagram of the selector valve of FIG. 14 in a first operational valve position;

FIG. 16 is a schematic diagram of the selector valve of FIG. 14 in a second operational valve condition;

FIG. 17 is a perspective view, with parts cut away for purposes of illustration, depicting the operating circuit of FIG. 14 packaged for use in an operating circuit housing in accordance with the teachings of our invention, and operatively connected to the dunnage bag of FIG. 6 for the deflation of the latter;

DETAILED DESCRIPTION OF THE INVENTION

At the outset of this description, it is to be noted that the use of re-usable, non-elastic air-filled dunnage bags of an inexpensive, light weight, thin walled, high strength plastic material for the protection of shock sensitive cargoes in cargo shipping containers in place of styrofoam blocks or the like which must be specially molded or cut to shape, or styrofoam beads or "popcorn", or shredded newspapers or the like has now, in accordance with considerations including effectiveness of cargo protection, cushioning material—cargo compatability with regard to desired extent of cushioning effect and elimination of potential hazards to cargo resulting from generation of static electricity by the cushioning materials and/or outgrassing from the same, cost effectiveness in terms of both initial costs of the cushioning materials and the disposal costs therefor, overall cargo container shipping weight, and protection of the environment, become increasingly accepted on a truly world-wide basis; and, in certain jurisdictions both here in The United State and abroad, virtually mandated by environmentally motivated legislation outlawing the use of at least such styrofoam blocks or "popcorn" to those purposes. Thus, wide-spread real and present need unquestionably now exists for apparatus and method which are highly satisfactory in all material regards to the filling of such dunnage bags with ambient air, in particular in situ in cargo containers, and the subsequent like deflation of the dunnage bags at the cargo container destination for ready and economic re-use, thus totally eliminating cushioning material disposal costs and the adverse environmental impact of the same.

Figure 1:
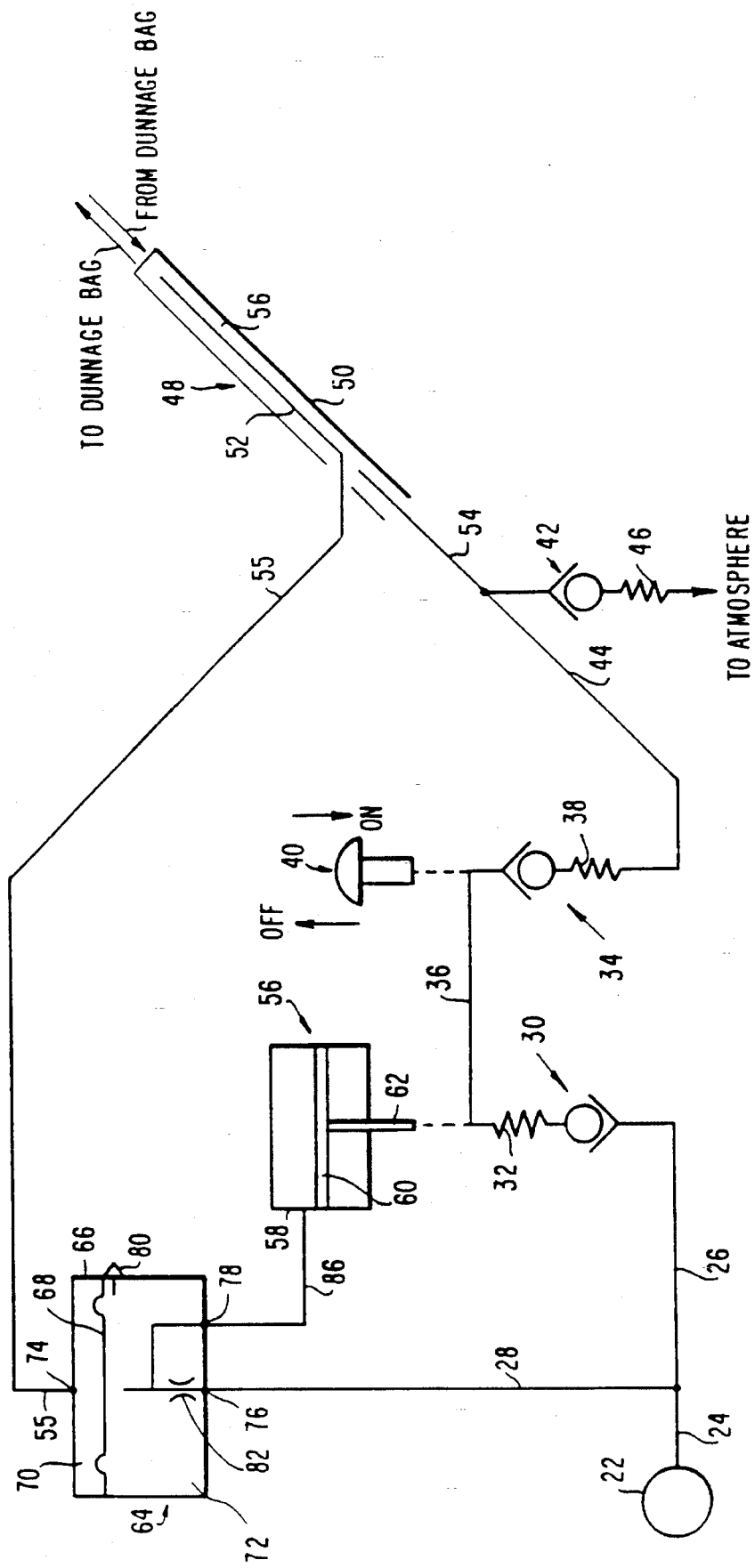
FIG. 1 is a schematic diagram depicting a fluidic operating circuit configured and operable in accordance with the teachings of a first embodiment of the currently contemplated best mode of the apparatus and method of our invention.

To this effect, and referring now to FIG. 1 of the application drawings, a fluidic operating circuit representatively configured and operable in accordance with the teachings of a first embodiment of the currently contemplated best mode of our invention is schematically depicted and indicated generally at 20.

A readily adjustable source of pressurized ambient air, which does not per se form part of this embodiment of our invention, for example a compressor, is schematically indicated at 22; and may be understood to include a suitable air filter of, for example, 40 micron particle separation capability. For a typical industrial scale application of the apparatus and method of our invention, compressor 22 would simply form part of the existing, immediately available plant pressurized air supply system which would be readily adjustable through use for example of an included pressure regulator, to supply pressurized ambient air throughout a range of between 7 to 25 PSIG to operating circuit 20 through pressurized air supply line 24 which branches as shown into pressurized air supply lines as indicated at 26 and 28, respectively.

A spring biased, cartridge check valve assembly is schematically indicated at 30 and is disposed as shown in pressurized air supply line 26. Valve assembly 30 includes a relatively low force constant spring as indicated at 32 which, for a typical application of the apparatus and method of our invention, would be rated to retain the valve assembly 30 closed at air supply pressures below 7 PSIG in supply line 26.

A spring biased, cartridge check valve assembly is indicated schematically at 34, and is connected as shown to the output side of check valve assembly 30 by pressurized air supply line 36. Valve assembly 34 includes a relatively high force constant spring as indicated at 38 which, for a typical application of the apparatus and method of our invention, would be rated to maintain the valve assembly 34 closed at air supply pressures below 30 PSIG in supply line 36.

A manually operable apparatus actuating push button assembly is indicated schematically at 40; and is mechanically connected as indicated by the dashed line to the cartridge check valve assembly 34 in such manner that manual downward depression of the push button 40 by the apparatus operator from the "OFF" position thereof to the "ON" position thereof as indicated in FIG. 1 will open valve assembly 34 against the action of spring 38 to enable the flow of pressurized air through the latter despite the fact that the same is at less than 30 PSIG. Conversely, the removal of manual downward pressure from push button assembly 40 will enable the return of the same from the indicated "ON" to "OFF" positions thereof under the action of valve spring 38 thereby closing the valve assembly 34 to the further flow of pressurized air therethrough, assuming of course that the supply air pressure in supply line 36 is below 30 PSIG in the given example.

A spring biased cartridge check valve assembly, which operates as a safety relief valve as described in detail hereinbelow, is indicated schematically at 42 in FIG. 1, and is connected as shown to the output side of valve assembly by a pressurized air supply line as indicated at 44. Valve assembly 42 includes a spring 46 also of relatively low force constant which, for a typical application of the fluidic operating circuit 20 of our invention under discussion, would be rated to retain the valve assembly closed at air pressures below 10 PSIG in supply line 44.

A coaxial dunnage bag filling and dunnage bag fullness sensing tube assembly, or wand, is schematically indicated at 48 in FIG. 1; and comprises an outer pressurized air supply dunnage bag fill tube 50, and an inner dunnage bag fullness sensing tube 52 coaxially disposed therewithin; and a pressurized air supply line as indicated at 54 connects supply line 44 beyond relief valve 42 to the input end of dunnage bag fill tube 50.

Figure 2:
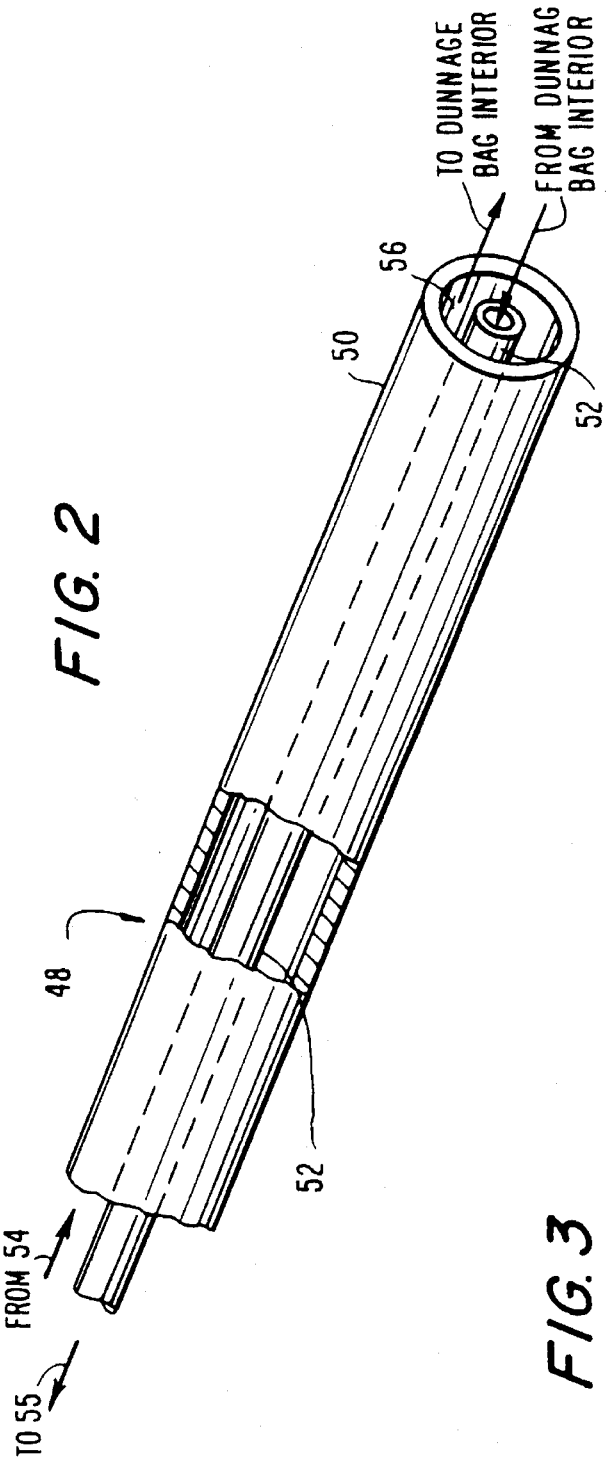
FIG. 2 is a perspective view, with parts cut away for purposes of illustration, depicting the outer portion of the wand assembly of the operating circuit of FIG. 1.

The mechanical arrangement of the outer dunnage bag fill tube 50 and the coaxial inner dunnage bag fullness sensing tube 52 is better illustrated in FIG. 2 of the application drawings; with the same making clear the relative dispositions of the tubes 50 and 52 and the formation of an annulus 56 therebetween. In addition, FIG. 2 illustrates that pressurized supply air from supply line 54 will flow through the wand 48 via the annulus 56 into the interior of an operatively connected dunnage bag as illustrated and described in greater detail hereinbelow; while the resultant air pressure created at the tip of the inner bag fullness sensing tube 52 will be concomitantly communicated therethrough via a sensing line 55 for control of the operation of the fluidic operating circuit 20 of FIG. 1, again as illustrated and described in greater detail hereinbelow.

A piston-cylinder assembly is indicated schematically at 56 in FIG. 1 and comprises a cylinder 58 and a piston 60 slidably disposed therewithin. The rod 62 of piston 60 is mechanically connected as indicated by the dashed line to cartridge check valve assembly 30 in such manner that downward movement of the piston 60 in cylinder 58 as seen in FIG. 1 will be effective in conjunction with valve spring 32 to close valve assembly 30 despite air supply pressures in supply line 26 of up to the maximum of 25 PSIG as can be provided by compressor 22 in the typical operational example of the apparatus and method of our invention here under discussion.

A fluidic diaphragm amplifier taking for example the form of that illustrated and described in some detail as the F-4014-Series Diaphragm Amplifiers at pages 3 and 4 of Publication 8450 of the Air Logic Division of Fred Knapp Engineering Co., Inc., 5102 Douglas Avenue, Racin, Wis. 53402, is indicated schematically at 64 in FIG. 1. As described in that Publication, fluidic diaphragm amplifier 64 comprises a housing 66 which is divided by a pilot diaphragm 68 into an input chamber 70 and a vented, supply-output chamber 72. Chamber 70 includes an input port 74; while chamber 72 includes supply, output and vent ports as indicated at 76, 78 and 80, respectively.

Pressurized air supply line 28 extends as shown into communication with amplifier supply port 76 to supply pressurized air from compressor 22 thereto through a restricting orifice as indicated at 82 internally of the amplifier chamber 72. Dunnage bag fullness sensing line 55 extends as shown from the inner end of dunnage bag fullness sensing tube 52 of the wand 48 to connect the same to the input port 74 of the fluidic diaphragm amplifier 64; while an output line 86 extends as shown from the amplifier output port 78 to cylinder 58 of piston-cylinder assembly 56 above piston 60 to communicate the diaphragm amplifier output signal pressure thereto.

Although believed well understood by those skilled in this art, it is nonetheless considered well to insure completeness of description of the apparatus and method of our invention that the essential operational characteristics of the fluidic diaphragm amplifier 64 be illustrated and described in somewhat greater detail. Accordingly, and referring now to FIGS. 3 and 4 of the application drawings, which respectively depict the amplifier 64 in the "Input Off" and "Input On" conditions thereof, FIG. 3 makes clear that with the input signal from sensing line 55 "off," or below the amplifier actuating level, a circular flat spring 88 which is included as shown in the amplifier pilot diaphragm 68 functions to bias the same away from the opening formed by amplifier chamber 72 between the supply port 76 and the vent port 80 thereby enabling a jet of the pressurized air as supplied to the amplifier 64 to pass through supply port 76 and amplifier output chamber 70 to atmosphere out of amplifier vent port 80. As this occurs, and in accordance with the venturi effect created by air flow through restriction 82 in the amplifier supply port 82, air will be drawn with the supply air from the amplifier output chamber 70 for flow therewith to atmosphere, thereby creating a slight negative pressure in that chamber for communication through output port 78 and line 86 to cylinder 58 above piston 60 to retain the latter in the schematically depicted upper or top dead center position thereof without closure effect on cartridge check valve assembly 30.

Figure 4:
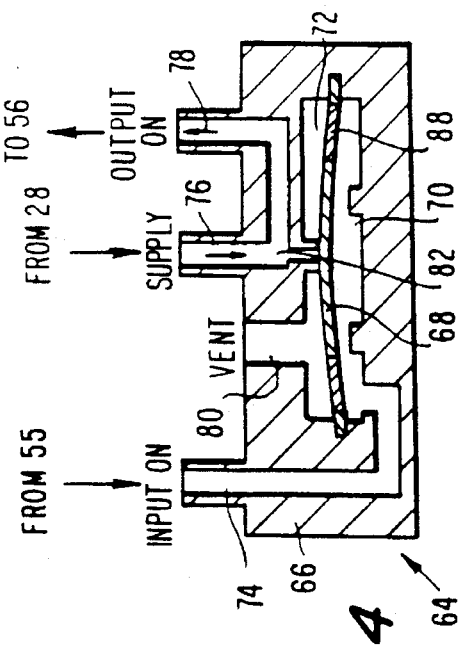
FIG. 4 is a cross sectional view of the fluidic diaphragm amplifier of the operating circuit of FIG. 1 depicting the amplifier in the "INPUT ON" condition thereof.

Conversely, and with fluidic diaphragm amplifier 64 in the "Input On" condition thereof as depicted in FIG. 4 with the input signal from sensing line 55 and input port 74 above the amplifier actuating pressure level, it will be seen that pilot diaphragm 68 is biased thereby by that pressure level in input chamber 70 against the action of flat spring 88 to seal off fluid flow communication through diaphragm output chamber 72 between supply port 76 and vent port 80, whereby the total pressurized air supply from line 28 will flow through output chamber 72 to and through amplifier output port 78 and connected line 86 to cylinder 58 above piston 60 to force the same to the non-depicted lower or bottom dead center position thereof against the action of valve spring 32 to close the cartridge check valve assembly 30 and prevent further flow of the pressurized air from supply line 26 therethrough. Under these circumstances, and with cylinder 58 virtually immediately presenting a dead-ended load which will receive the full pressurized air supply from supply line 28 through the amplifier 64, and with cartridge check valve assembly 30 presenting a dead-ended load to pressurized air supply along supply line 26, it will be immediately understood by those skilled in this art that no further consumption of the pressurized air supplied as heretofore described to the fluidic operating circuit 20 of the apparatus of our invention will occur for so long as these fluidic circuit operating conditions continue to exist. Thus, and with compressor 22 operationally configured to unload and run at a significantly reduced electrical energy consumption level in the face of a dead-ended load, electrical energy is conserved.

Figure 5:
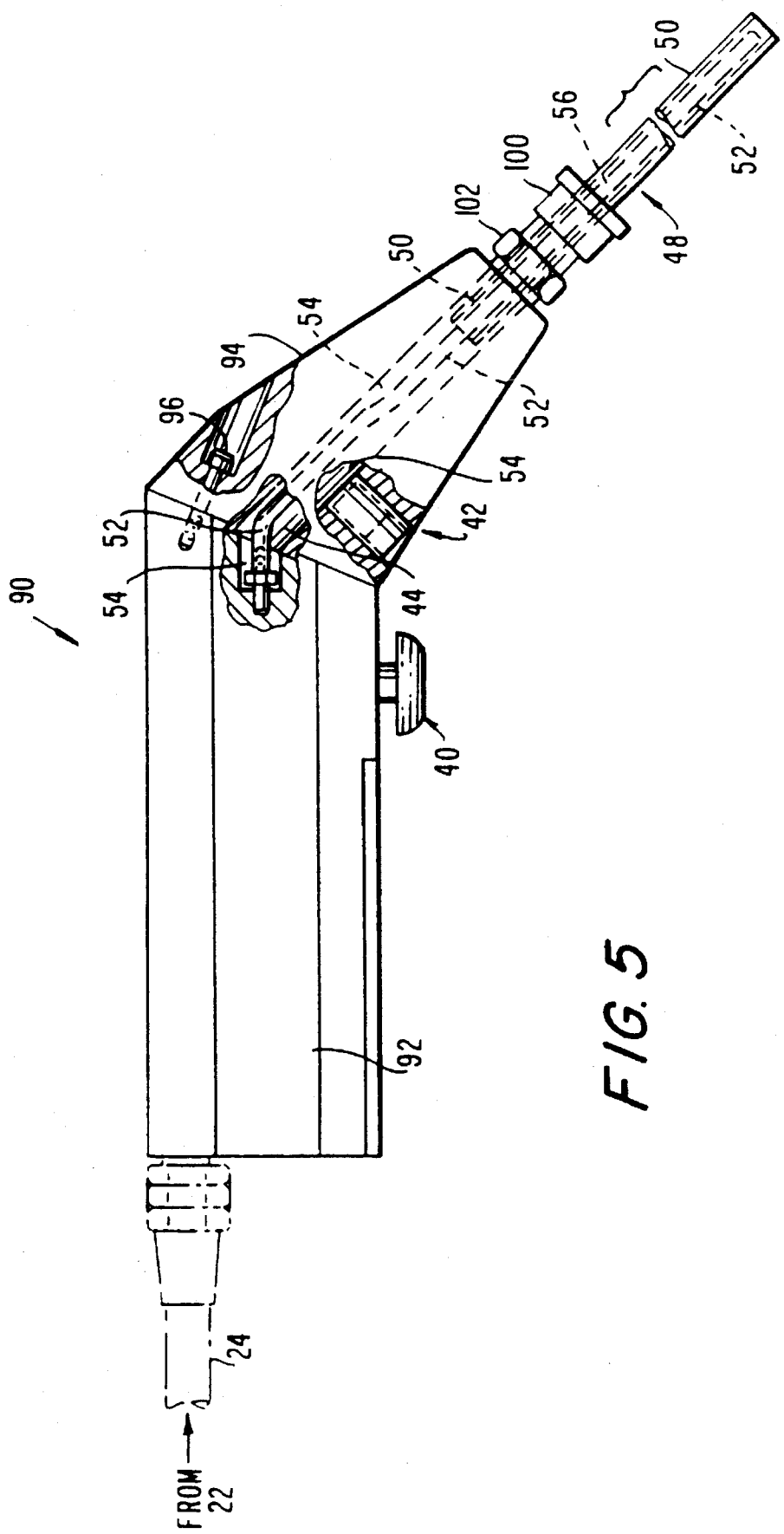
FIG. 5 is an assembly view, with parts cut away for purposes of illustration, depicting the operating circuit of FIG. 1 packaged for use in an operating circuit housing.

FIG. 5 of the application drawings depicts the fluidic operating circuit 20 of FIG. 1 representatively packaged in accordance with the currently contemplated best mode of our invention; and, to that effect, depicts an operating circuit housing as generally indicated at 90 which comprises a main housing section 92 and a nozzle or wand section 94 joined as shown thereto in fluid-tight manner at an approximately 45' angle by a suitable attachment screw as indicated at 96. The housing sections 92 and 94 are preferably molded from any readily available, appropriately light weight, high strength and electrically non-conductive material, for example ABS plastic. FIG. 5 makes clear that the inner dunnage bag hardness sensing tube 52 is fixedly attached at the inner end thereof by a barbed fitting 98 to extend therefrom through the mating passages in housing sections 92 and 94 which form the pressurized air supply line 44 and 54 of FIG. 1; and further extends from the outer end of housing section 94 coaxially through the outer dunnage bag fill tube 50 to form the annulus 56 of FIG. 2 therebetween, with relief cartridge check valve assembly 42 extending as shown from the passage in housing section 94 which forms pressurized air supply line 44 through that housing section to atmosphere upon opening of that relief valve assembly under operational conditions as described in detail hereinbelow. FIG. 5 also makes clear that the dunnage bag fill tube 50 is telescopically disposed into the outer end of the passage in housing section 94 which forms pressurized air supply line 54; and is adjustably retained in position relative to that housing section and the outer end of coaxial dunnage bag hardness sensing tube 52 by a two piece, Sigma-type collet locking sleeve assembly or fitting as indicated at 100 and 102, thereby making possible the ready and convenient adjustment, to purposes described in detail hereinbelow and without requirement for tools or specialized skills of any nature, of the position of the outer end of tube 50 relative to the outer end of tube 52.

More specifically, such adjustment requires only the manual grasping of piece 100 of the locking sleeve assembly and the sliding of the same forward or away from housing section 94 along tube 50 from the depicted locking detent position of the sleeve assembly to release the tube 50 from the grasping action thereof, the manual grasping of the thusly released tube 50 and the sliding thereof inwardly or outwardly relative to the housing section 94 to change the position of the outer end of tube 50 relative to the fixed position of the outer end of tube 52, and the sliding of the locking sleeve assembly piece 100 backward along the thusly re-positioned tube 50 to return the same to the depicted locking detent position thereof and again fixedly grasp the tube 50 in the new position thereof. For purposes made clearer hereinbelow, it may be understood that both the outer dunnage bag fill tube 50 and the inner dunnage bag fullness sensing tube 52 are fabricated from any suitable readily available and relatively pliable plastic tubing material which is simply cut to the appropriate lengths to form the same; with the formation of any particularly sharp tubing edges, especially at the outer end of tube 50, to be avoided.

A dunnage bag representatively fabricated and configured in accordance with extremely low unit cost contemporary technological techniques to that effect is indicated generally at 106 in application drawing FIG. 6, and will be seen to comprise a main body portion 108 formed as shown by overlapped single or multi-ply sheets 110 and 112 of an appropriate, high strength and low cost plastic film material, for example polyurethane, suitably sealed together in airtight manner as indicated at 114 substantially around the respective perimeters thereof by any appropriate technique, for example simple heat sealing. A dunnage bag fill stem, comprising nothing more than an essentially flattened tube of the same plastic material from which the dunnage bag 106 is fabricated, is indicated at 116 in FIG. 6, and extends as shown into the interior of the sealed bag body portion 108 between sheets 110 and 112 to communicate the same with the ambient air therethrough. The fill stem 116 is sealed in like air-tight manner as indicated at 118 to the bag body portion sheets 110 and 112. The fill stem 116 includes a conventional flapper or duck bill type valve as indicated generally at 120 formed by mating sheets 122 and 124 of the same plastic material here under discussion which are sealed within the stem as indicated at 126 to provide an opening 128 extending therethrough into communication with the interior of the bag body portion 108 through the fill stem 116; and which, in the absence of anything disposed in the opening 128 to open or spread the valve sheets 122 and 124 apart, will prevent the flow of air from the bag interior to the surrounding atmosphere to thus function as a particularly inexpensive and effective check valve. For reasons made clearer hereinbelow, it may be understood that the outer diameter of dunnage bag fill tube 50 is predetermined in accordance with the size of opening 128 in the dunnage bag valve 120 to insure that the tube may be readily inserted therethrough with some measure of clearance therebetween.

Having described the contemporary dunnage bag 106 in detail, it is here considered appropriate to reiterate the particularly marked contrasts in terms of material and fabrication costs, configuration, and manner of inflation, between the same and the highly specialized dunnage bag to which the Bag Inflation Air Gun of Angarola is dedicated, and the basketballs, footballs, vehicle tires or specialized cushioning bags to which the Ball Inflation Apparatus of Stuckel is dedicated, both as described in some detail hereinabove in our description of the prior art; with these particularly marked contrasts believed to now make even clearer to those skilled in this art the absolute inapplicability of the Bag Inflation Gun of Angarola and the Ball Inflation Apparatus of Stuckel to the filling of contemporary dunnage bags, in particular in situ in cargo containers.

Referring now to FIG. 7 of the application drawings, pneumatic wand apparatus configured and operable as heretofore described in accordance with the teachings of the first embodiment of our invention are indicated generally at 130, and are depicted in operative relationship with dunnage bag 106 for the filling of the same with pressurized ambient air. More specifically, this will be seen to require nothing more than the simple insertion of the outer portion of the apparatus wand assembly 48 through the bag fill stem 116 and the opening 128 in the bag flapper valve assembly 120 so that the wand extends therethrough as shown into the otherwise sealed interior of the dunnage bag. Although not shown to avoid undue complication of drawing FIG. 7, it should be immediately clear to those skilled in this art that the respective wand apparatus—dunnage bag dispositions depicted therein are readily achieved by the simple manual grasping of the wand apparatus 130 in one hand of the wand operator, and the like grasping of the dunnage bag 106 in the other hand at and around the area of the bag fill stem 116 to press the same, and the respective flapper valve sheets 122 and 124 into relatively firm contact with the underlying surface portions of the wand assembly 48 to retain the dunnage bag 106 positioned as shown relative thereto and prevent the bag 106 from simply blowing away from the wand once pressurized ambient air is introduced thereinto. In addition, this grasping of the dunnage bag 106 and pressing of the bag fill stem assembly 106 against the underlying portion of wand assembly 48 as described will of course function to seal, at least in large measure, the clearance between the opening 128 in the bag valve assembly 120 and the wand assembly 120 to substantially limit, although most probably not totally prevent, the escape of some portion of the pressurized air therethrough upon the introduction of the same into the dunnage bag 106. Of course, the extent to which the dunnage bag 106 must be grasped and retained in position by the one hand of the apparatus operator relative to the wand assembly 48 will be dependent upon the environment in which the bag is to be filled; with the filling of the dunnage bag 106 in situ in a cargo container wherein the bag is in substantial surface contact with the cargo and/or the walls of the cargo container lessening the extent to which the bag must be grasped and retained in position relative to the wand assembly 48 to prevent separation therebetween while the bag is being filled.

Figure 8:
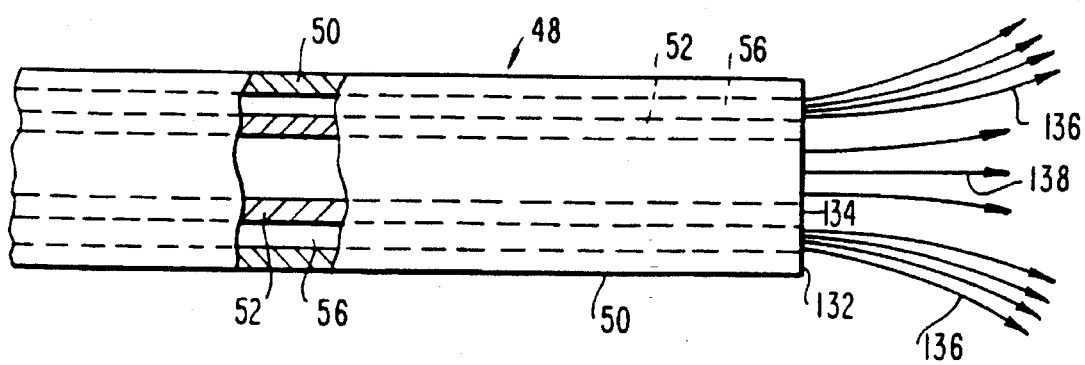
FIG. 8 is a side view, with parts cut away for purposes of illustration, depicting the end portion of the wand assembly of the operating circuit of FIG. 1, and illustrating a first representative relative disposition of the respective ends of the outer and inner tubes of that wand assembly.

With the wand assembly 48 of the apparatus 130 operatively positioned as shown in FIG. 7 in the dunnage bag 106, the actuating level of the fluidic diaphragm amplifier 64 set by way of representative example at 1"+0.25" Water Column and the amplifier of course in the "INPUT OFF" condition thereof, the outer dunnage bag fill tube adjusted as heretofore described so that the tube end 132 is even with the end 134 of the inner dunnage bag fullness sensing tube 52 as illustrated in FIG. 8 of the application drawings, and compressor 22 of FIG. 1 set to supply pressurized ambient air at 25 PSIG to supply line 24, respectively, it will be understood by those skilled in this art that the pressurized air from supply line 24 will flow therefrom through connected supply line 28 into the amplifier 64 through amplifier supply port 76 and orifice 82 into and through the amplifier supply-output chamber 72 to atmosphere through amplifier vent port 80, with the slight negative pressure created by the resultant venturi effect in amplifier chamber 72 as heretofore described being communicated via amplifier output port 78 and connected line 86 to cylinder 58 above piston 60 to retain the latter in the schematically depicted upper or top dead center position thereof of FIG. 1. Concomitantly, the pressurized ambient air at 25 PSIG from supply line 22 will be communicated via connected supply line 26 to cartridge check valve assembly 30 to open the same against the action of valve spring 32 which enables opening of the valve at supply air pressures above 7 PSIG for flow therethrough; and, via connected supply line 36, to cartridge check valve assembly 34 which will then be effective to discontinue further supply air flow at that point since valve spring 38 is operable as heretofore described to retain valve 34 closed at supply air pressures in line 36 below 30 PSIG. Thus, the apparatus 130 of our invention will remain essentially static under these operating conditions; with the pressurized supply air from compressor 22 simply flowing to atmosphere as described through amplifier vent port 80, and the amplifier orifice 82 operating to perform an economical bleed function to limit pressurized air flow to atmosphere, and thus consumption thereof, under these apparatus operating conditions.

Filling of the operatively connected dunnage bag 106 of FIG. 7 is then readily commenced as desired by the simple manual depression of the apparatus actuating pushbutton assembly 40 to mechanically open cartridge check valve assembly 34 against the action of valve spring 38 whereupon the pressurized supply air will flow through valve 34 and, via connected supply lines 44 and 54, through the annulus 56 between the outer and inner tubes 50 and 52 of the wand assembly 48 into the interior of the bag 106; with the dynamic pressure drops in supply line 36, cartridge check valve assembly 34 and supply line 44 reducing the pressure of the supply air at the relief valve 42 to approximately 8

PSIG in the given example to prevent opening of the valve 42, and further reducing that supply air pressure due to dynamic pressure drops in supply line 54 and wand assembly annulus 56 to approximately 5 PSIG in the given example at the tip of the wand assembly. Thus may be understood that, in the given example, the dunnage bag 106 will never "feel" the pressurized supply air at 25 PSIG which, in any event, would most probably immediately burst a contemporary dunnage bag of the nature heretofore described in conjuntion with FIG. 6 of the application drawings.

Figure 3:
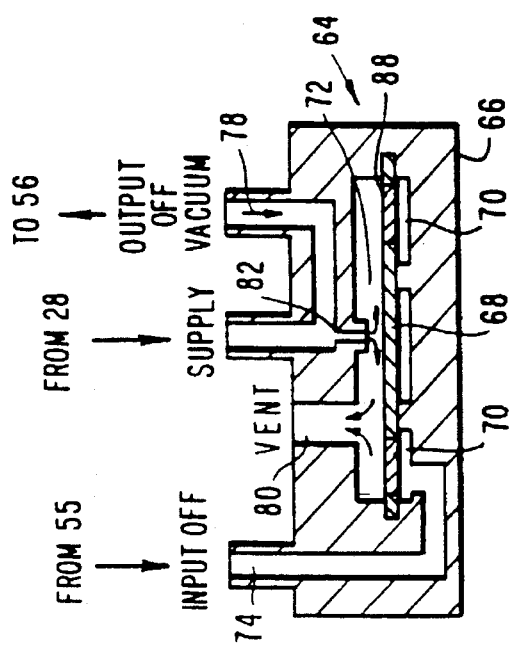
FIG. 3 is a cross sectional view of the fluidic diaphragm amplifier of the operating circuit of FIG. 1 depicting the amplifier in the "INPUT OFF" condition thereof.

With the pressurized supply air flowing as heretofore described out of the end of the annulus 56 in the wand assembly 48 into the interior of the dunnage bag 106 as indicated by the arrows 136 in FIG. 8, it will immediately be clear to those skilled in this art that, in accordance with the fluidic effect in the form of a venturi effect created thereby at the end 134 of the inner dunnage bag fullness sensing tube 52 which is surrounded by that annulus, a slight negative pressure as indicated by the arrows 138 in FIG. 8 will be created in the tube 52 and communicated therefrom through connected sensing line 55 as seen in FIG. 1 to the input port 74 and input chamber 70 of the fluidic diaphragm amplifier 64, thereby retaining the amplifier in the "INPUT OFF" condition of FIG. 3; it being noted that since the dunnage bag 106 is inelastic, and thus without "memory", no backpressure will be generated therein until the bag has been essentiall filled. However, and as the dunnage bag is filled, this venturi effect at the end of tube 52 will, of course, be stalled by the backpressure created in the bag, whereupon the pressure at the end 134 of the sensing tube 52 will abruptly shift from positive to negative. In the given example with the pressurized supply air at 25 PSIG, and the ends 132 and 134 of tubes 50 and 52 adjusted to be even as depicted in FIG. 8, this stalling of venturi effect at the end of tube 52, and abrupt shift in the pressure thereat from negative to positive, will occur when the overpressure in the dunnage bag has reached the level of one atmosphere +approximately 4" Water Column, or roughly 0.15 PSIG; and the communication of this now positive pressure in dunnage bag fullness sensing tube 52 through sensing line 55 and the amplifier input port 74 to the amplifier input chamber 70 will cause the virtually immediate, for example within 0.025 seconds, shifting of the amplifier 64 from the "INPUT OFF" condition thereof of FIG. 3 of the application drawings to the "INPUT ON" condition of drawings FIG. 4.

As a result of the above, the pressure in amplifier output line 86 will, again virtually immediately, shift from negative to positive, thereby applying a positive pressure, for example 20.0 PSIG due to system pressure drop, from amplifier supply—output chamber 72 through output port 78 and output line 80 to cylinder 58 of piston cylinder assembly 56 above piston 60 which, in accordance with the area of the latter, has been predetermined to be sufficient to force piston 60 downwardly to the non-depicted lower or bottom dead center position thereof against the action of valve spring 32 and the action of the pressurized supply air from compressor 22 thereby automatically discontinuing the supply of pressurized air through the cartridge check valve assembly 30 to the operatively connected dunnage bag 106; and this despite the fact that the operator of the apparatus 130 continues to hold the push button assembly 40 in the depressed position thereof to maintain cartridge check valve assembly 34 open. As this occurs, the cessation of the sound of the pressurized supply air rushing into the dunnage bag 106 through the wand assembly 48 as heretofore described, combined with the visual observation of the condition of the dunnage bag to whatever extent possible, will immediately alert an experienced apparatus operator to the fact that filling of the dunnage bag to the desired overpressure has been completed; whereupon the operator simply withdraws the wand assembly 48 from the bag fill stem 128 with the bag duck bill valve assembly 120 of FIGS. 6 and 7 automatically closing behind the wand assembly as the same is withdrawn from the fill stem due to the overpressure in the bag to thus automatically sealed the thusly filled bag and complete the bag filling process. Of course, the slight leakage as heretofore described of some portion of the pressurized supply air around the wand assembly 48 through the opening 128 in the dunnage bag fill stem 116 from the dunnage bag as the same becomes overpressured can result in some measure of pulsing and leak-filling of the bag in accordance with very rapid shifting of the fluidic diaphragm amplifier 64 between the "INPUT ON" and "INPUT OFF" amplifier conditions, and attendant cycling of the cartridge check valve assembly 30 between the fully closed and at least partially open conditions thereof; but the extent of this in any event nonconsequential leak and pulse-filling phenomenon will be limited by the experience of the apparatus operator and his or her reaction time to the fact that filling of the dunnage bag 106 has been completed, and that the wand assembly 48 is to be withdrawn therefrom.

In the event of malfunction in the fluidic diaphragm amplifier 64, the piston-cylinder assembly 45, and/or the cartridge check valve assembly 30 as would otherwise result in the continuation of pressurized air supply through the wand assembly 48 to the operative connected dunnage bag 106 after the latter has reached the desired overpressure, the supply air pressure in supply line 44 will very rapidly, in the given example, exceed 10 PSIG, whereupon the safety relief cartridge check valve assembly will open against the action of valve spring 46 to vent the pressurized air supply to atmosphere thereby preventing bursting of the dunnage bag 106 and, in those instances wherein the bag is being filled in situ in a cargo container, damage to the cargo which is meant to be protected thereby. In like manner, should the apparatus operator inadvertently depress the pushbutton assembly 40 with the end of the wand assembly 48 substantially closed as by surface contact with a wall of the cargo container, safety relief cartridge check valve assembly 42 will again virtually immediately open in the face of the resultant "dead" load to vent the pressurized supply air to atmosphere and thus prevent overpressurization and damage to any of the essential operating components of the apparatus 130. Of course, prevention of overpressurization and resultant bursting of the operatively connected dunnage bag 106 as heretofore described by the valve assembly 42 also prevents injury to the apparatus operator as might otherwise result therefrom.

Adjustment in the extent to which the operatively connected dunnage bag 106 is overpressured by the apparatus 130 of our invention is readily and conveniently achieved by the particularly simple manual adjustment of the position of the end 132 of the pressurized air supply tube 50 relative to the fixed position of the end 134 of the inner bag fullness sensing tube 52; with extension of the outer tube end 132 beyond inner tube end 134 resulting in a greater venturi effect or harder "pull" at the inner tube end 134 to thus require a higher overpressure in the dunnage bag 106 to stall the venturi and discontinue pressurized air supply thereto as heretofore described, and withdrawal of the outer tube end 132 inwardly of the inner tube end 134 resulting in a lesser venturi effect or sofer "pull" at the latter to thus require a lower overpressure in the dunnage bag 106 to stall the venturi and discontinue pressurized air supply to the dunnage bag.

Figure 9:
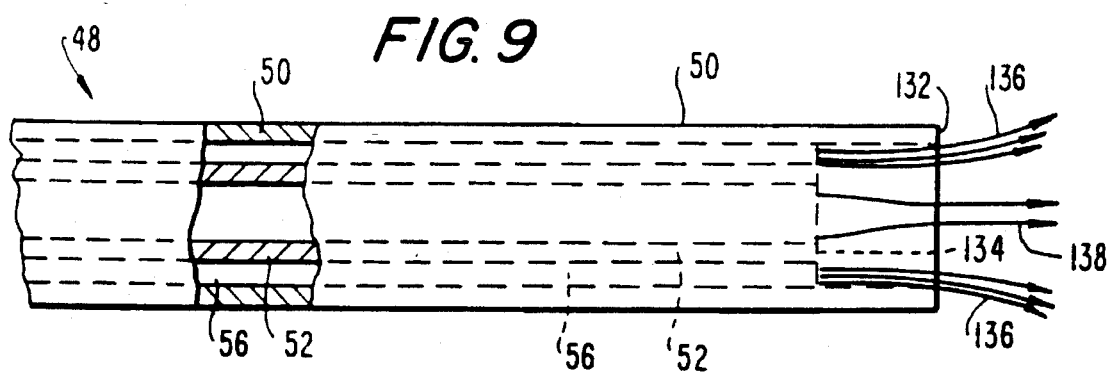
FIG. 9 is a side view, with parts cut away for purposes of illustration, depicting the end portion of the wand assembly of the operating circuit of FIG. 1, and illustrating a second representative relative disposition of the respective ends of the outer and inner tubes of that wand assembly.

More specifically, and referring now to FIG. 9 of the application drawings which depicts the pressurized air supply tube 50 adjusted through use of the Sigma-type fitting 100, 102 as heretofore described so that the tube end 132 extends approximately one inch beyond the end 134 of the inner dunnage bag fullness sensing tube 52, it may be understood that, in the given example, an overpressure of one atmosphere +approximately 10" Water Column, or roughly 0.35 PSIG, in the dunnage bag 106 will be required before the venturi is stalled at tube end 134 and pressurized air supply to the dunnage bag 106 automatically discontinued by the apparatus 130 of our invention as heretofore described. Conversely, and with the outer pressurized air supply tube 50 adjusted so that the tube end 132 is disposed approximately one half inch behind or inwardly of the end 134 of the inner dunnage bag fullness sensing tube 52 as depicted in FIG. 10 of the application drawings, it may be understood that, in the given example, overpressurization of the dunnage bag 106 to a level of one atmosphere +approximately 1" Water Column, or roughly only 0.035 PSIG will be required before the venturi is stalled at tube end 134 and pressurized air supply to the dunnage bag 106 automatically discontinued by our apparatus 130.

Figure 10:
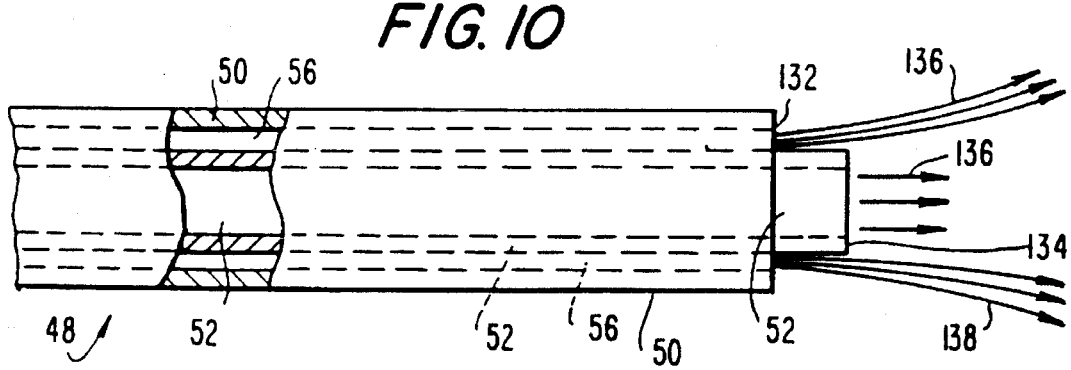
FIG. 10 is a side view, with parts cut away for purposes of illustration, depicting the end portion of the wand assembly of the operating circuit of FIG. 1, and illustrating a third representative relative disposition of the respective ends of the outer and inner tubes of that wand assembly.
Figure 11:
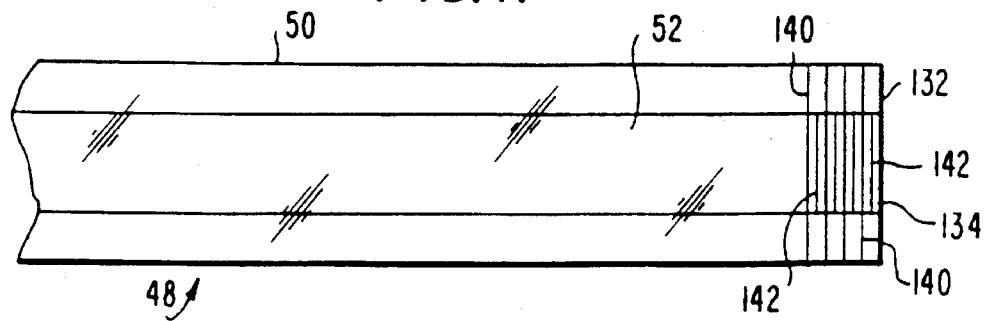
FIG. 11 is a side view depicting the end portion of the wand assembly of FIG. 1 wherein the outer wand assembly tube is made of a transparent material.

Of course, a virtually infinate range of adjustments between the representative dispositions of the ends 132 and 134 of the outer and inner tubes 50 and 52 of the wand assembly 48, and corresponding levels of overpressurization in the dunnage bag 106, as depicted and described in conjunction with FIGS. 8, 9 and 10 of the application drawings are made possible by the teachings of our invention. Too, and as illustrated in FIG. 11 of the application drawings, the outer pressurized air supply tube 50 may readily be made from a transparent plastic material and include visible indicia as indicated at 140 formed thereon at the end portion thereof which can be appropriately labeled as such in terms of corresponding dunnage bag overpressurization and brought into alignment with the clearly visible end 134 of the inner dunnage bag fullness sensing tube 52 by adjustment of the outer tube 50 relative thereto as heretofore described to achieve the provision of the indicated level of overpressurization of the dunnage bag 106 in each instance. Like indicia as indicated at 142 which will be clearly visible through transparent outer tube 50 can also be formed as shown on the outer portion of the inner wand tube 52.

The significant advantages of this provision for the ready and convenient adjustment in the level of dunnage bag overpressurization, or hardness, in accordance with the teachings of our invention include the capability for immediately meeting differing cargo—dunnage bag compatability requirements on site; with, for example, a greater degree dunnage bag hardness being called for in those instance wherein the dunnage bags in question are for use in the support and protection from shock damage of relatively heavy palletized cargo in a cargo shipping container, and a lesser degree of dunnage bag hardness being called for in those instances, for example, wherein the dunnage bags are to be utilized to separate, support and protect from shock damage relatively light, highly sensitive cargo in the nature of electronic circuit boards or fluorescent light bulbs or the like in a cargo shipping container.

Deflation and reclamation for economic re-use of the filled dunnage bags 106 at the point of destination of the cargo container is readily and conveniently accomplished in accordance with the teachings of our invention. More specifically, and as illustrated by FIG. 12 of the application drawings, a filled dunnage bag 106 need only be placed on a relatively flat surface, which may be within or without the cargo container, the apparatus 130 manipulated to insert the wand assembly 48 through the opening 128 in the bag fill stem 116 as heretofore described, and the bag simply flattened by the application of manual pressure thereto as shown by both hands of the operator to force the air out of the bag to atmosphere through the space between the outer wand tube 50 and the bag fill stem opening 128. Alternatively, the outer wand tube 50 may simply be removed from the apparatus housing 90 through use of the fitting 100, 102 as heretofore described and inserted as such in the manner of a straw through the bag fill stem opening 128 to again open the flapper valve 120 as shown in FIG. 13 of the application drawings, and both hands of the operator again used to simply flatten the bag 106 to force the air therefrom to atmosphere through tube 50. Of course, deflation of the filled dunnage bag as described into the original essentially flat bag configuration makes possible the efficient return of the same, with minimum shipping space requirements, to the cargo shipper for immediate re-use to significant economic advantage, and with literally zero adverse environmental impact.

Figure 14:
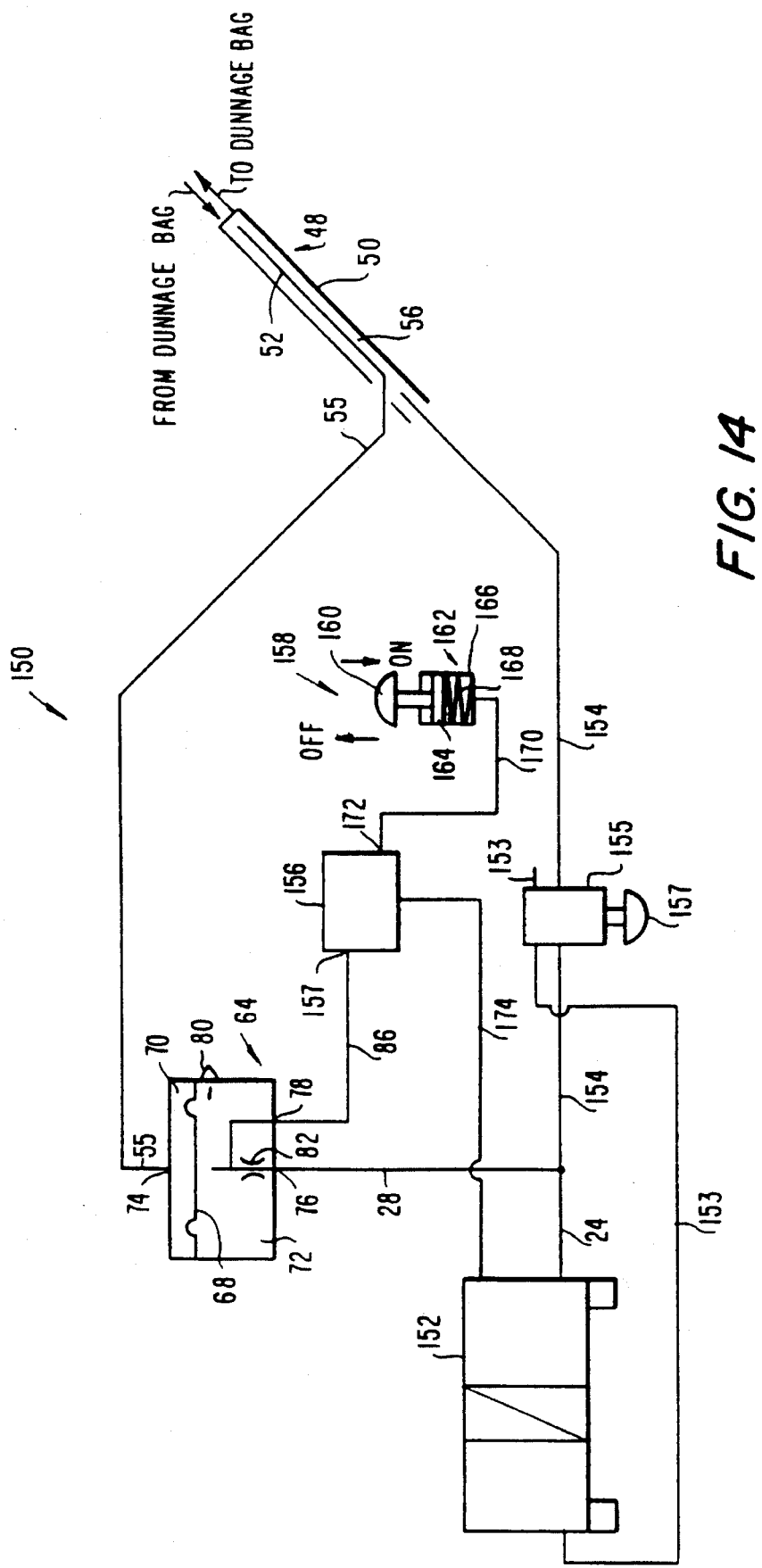
FIG. 14 is a schematic diagram depicting a fluidic-electric operating circuit configured and operable in accordance with the teachings of a second embodiment of the currently contemplated best mode of the apparatus and method of our invention.

A fluidic—electric operating circuit representatively configured and operable in accordance with the teachings of a second embodiment of the currently contemplated best mode of the apparatus and method of our invention is schematically depicted and indicated generally at 150 in FIG. 14 of the application drawings. Since a number of the components of the operating circuit 150 of FIG. 14 are the same as those heretofore described in conjunction with the operating circuit 20 of FIG. 1 of the application drawings, like reference numerals are utilized in FIG. 14 to identify the same.

With more specific reference to the operating circuit 150 of FIG. 14, the same will be seen to comprise a source of pressurized supply air as schematically indicated at 152, and which preferably takes the form, for example, of a low sound level linear piston pump which is electrically driven by an included electric drive motor. Pump 152 is operable to supply pressurized ambient air through a vacuum line 153, which connects as shown to the pump inlet, to the operating circuit 150 along supply line 24 at an appropriate dunnage bag inflation pressure, for example 5 PSIG. Supply line 24 branches as shown into air supply line 28 which extends as heretofore described into communication with the vented supply—output chamber 72 of the fluidic diaphragm amplifier 64 through amplifier port 76; and into pressurized air supply line 154 which, in the invention embodiment of FIG. 14, will be seen to supply the pressurized air from pump 152 directly to the annulus 56 formed as heretofore described between the outer pressurized air supply tube 50 and the inner dunnage bag fullness sensing tube 52.

A two position four way-function, five ported selector valve is indicated schematically at 155 in FIG. 14, and is operatively connected as shown in pressurized air supply line 154 and vacuum line 153, respectively. A two position selector valve actuating push button assembly is indicated schematically at 157 and is manually operable to move the valve between the respective first and second operating positions thereof.

With the selector valve 155 in the first operating position thereof as schematically depicted in FIG. 15, the valve connects vacuum line 153 through the internal valve port 159 to enable flow of ambient air therethrough to the inlet of pump 152, and connects pressurized air supply line 154 through the internal valve port 161 to enable the flow of pressurized air from the pump 152 and supply line 24 to the annulus 56.

With the selector valve 155 in the second operating position thereof as schematically depicted in FIG. 16 for dunnage bag deflation purposes as described in detail hereinbelow, the valve connects supply line to the right of the valve through the internal valve port 163 to the vacuum line 153 to enable the withdrawal of air through line 154 and the vacuum line 153 to the inlet of pump 152, and connects supply line 154 to the left of the valve through internal valve port 165 to atmosphere; it being here noted that the second position of the selector valve 155 is utilized only for automatic deflation of the dunnage bags at the point of cargo destination as described in greater detail hereinbelow.

A dual input, pressure operated electrical switch of essentially conventional configuration and manner of operation is indicated schematically at 156 in FIG. 14, and is connected as shown to the supply—output chamber 72 of the fluidic diaphragm amplifier 64 via amplifier output port 78, output line 86 and switch input port 157.

An apparatus actuating push button assembly is indicated schematically at 158 in FIG. 14 and, in this instance, includes a push button 160, and a piston-cylinder assembly as schematically indicated at 162 and which comprises a piston 164 slidably disposed in a cylinder 166 and biased upwardly in the same to the top dead center position of the piston by a cylinder-contained spring 168. Push button 160 is directly mechanically connected as shown to the top of piston 164.

A pneumatic apparatus actuating signal supply line is indicated at 170 and extends as shown to connect cylinder 166 below piston 164 to the other input port 172 of the pressure operated electrical switch 156. An electrical line is indicated at 174 and extends as shown from the switch 156 to the pump 152, and is operable to transmit an electrical signal from the switch to the pump 152 to turn on the pump drive motor and commence the supply of pressurized air to the operating circuit 150 under conditions as described in detail hereinbelow, and to subsequently transmit an electrical signal to the pump 152 to turn off the pump drive motor, again under conditions described in detail hereinbelow.

Although not shown, it will be understood that packaging of the operating circuit 150 of FIG. 14 in an appropriate housing would be essentially the same as that depicted and described hereinabove with reference to FIG. 5 of the application drawings regarding housing 90 for the operating circuit 20 of the embodiment of our invention of FIG. 1; it being immediately clear to those skilled in this art that the high degree of electrical non-conductivity of the ABS plastic material of that housing would insure protection of the apparatus operator from any and all electrical shock hazards from the operating circuit 150 of FIG. 14.

In operation, with selector valve 155 in the first operating position thereof, and with the wand assembly 48 of the operating circuit 150 of FIG. 14 operatively inserted through the fill stem 116 of a deflated dunnage bag 106 to fill the same in the manner heretofore described with reference to drawing FIG. 7, pump 152 set to supply pressurized ambient air to supply line 24 at 5 PSIG, the respective ends 132 and 134 of the outer pressurized air supply tube 50 and the inner dunnage bag fullness sensing tube 52 in alignment as depicted in FIG. 8, and the actuating level of the fluidic diaphragm amplifier 64 of the operating circuit again set at 1"+0.25 Water Column and the amplifier in the "INPUT OFF" condition thereof, it will be understood that manual depression of the push button 160 of FIG. 15 by the apparatus operator will be effective to force piston 164 downwardly in cylinder 166 against the action of spring 168 to compress the air therein and generate a pneumatic actuating signal for transmission via line 170 and input port 172 to pressure operated electrical switch 156 to close the same, with the resultant electrical signal from the switch on electrical line 174 functioning to turn on the electrical drive motor of pump 152 to commence the supply of pressurized ambient air at 5 PSIG to supply line 24.

Flow of this pressurized supply air at approximately 5 PSIG through connected supply line 28 into and through the supply—output chamber 72 of amplifier 64 to atmosphere through amplifier vent port 80 will again function to create a slight negative pressure as heretofore described at the amplifier output port 78 for communication via output line 86 to switch 156 via the switch input port 157 to maintain the switch in the closed position thereof and continue the supply of electrical power to the drive motor of pump 152. Concomitantly, this pressurized supply air will flow from supply line 24 through connected supply line 154 and wand assembly annulus 56 into the operatively connected dunnage bag 106, at slightly less than 5 PSIG due to dynamic pressure losses in lines 24 and 154, to commence the filling of the bag; with the resultant venturi effect created as heretofore described at the end 134 of the inner dunnage bag fullness sensing tube 52 again functioning to create a slight negative pressure in that tube for commuciation via sensing line 56 to the input port 74 of the amplifier 64 to maintain the amplifier in the "INPUT OFF" condition.

As filling of the dunnage bag 106 is compeleted and the same slightly overpressured, again for example to a level of one atmosphere +approximately 4" Water Column, the venturi effect at the inner tube end 134 will be stalled, to shift the pressure at the tube end from negative to positive, and this positive or bag overpressure will be communicated via sensing line 55 to the input port 74 of the fluidic diaphragm amplifier 64 to cause the virtually immediate shift in the same from the amplifier "INPUT OFF" to "INPUT ON" conditions. As this occurs, the pressure in the amplifier output line 86 will virtually immediately shift from negative to positive as heretofore described for application via amplifier output line 86 to the input port 157 of pressure operated electrical switch 156 to open the same and discontinue the operation of pump 152 and the supply of pressurized air thereby to the dunnage bag; whereupon the wand assembly 48 is then simply withdrawn from the fill stem 116 of the now filled dunnage bag 106 to complete the filling and sealing of the same by the flapper valve 120 as heretofore described with reference to FIGS. 6 and 7 of the application drawings. Although some apparatus pulsing and leak—filling of the dunnage bag 106 may again occur due to pressurized air leakage through the space between the outer wand assembly tube 50 and the bag fill stem opening 128, this will again prove inconsequential to the overall filling and sealing as described of the dunnage bag; with the cessation of operation of the pump 152 in any event functioning to alert an experienced apparatus operator to the fact that the operatively connected dunnage bag 106 has been filled to the desired overpressure, and that the wand assembly is to be withdrawn therefrom.

Operation as described of the fluidic—electric operating circuit 150 of FIG. 14 to automatically discontinue the supply of pressurized air by pump 152 to the dunnage bag 106 once the same has been filled to the desired overpressure is again totally independent of the fact that the apparatus operator may inadvertently continue to hold the pushbutton 160 in the "ON" position thereof once such bag filling has been completed; with spring 168 functioning in any event to return the pushbutton to the "OFF" position thereof once manual pressure is removed therefrom. As described in detail hereinabove with reference to FIGS. 8, 9 and 10 of the application drawings, it will immediately be clear to those skilled in this art that adjustment of the disposition of the end 132 of the outer pressurized air supply tube 50 of the wand assembly 48 relative to the end 134 of the inner dunnage bag fullness sensing tube 52 of that assembly will again function in the fluidic—electrical operating circuit 150 of our invention to change the degree to which the operatively connected dunnage bag 106 is overpressured as desired.

Since, as heretofore described, with the selector valve 155 in the second operational position thereof to draw air from supply line 154 to the right of the valve into the inlet of pump 152 via vacuum line 153, deflation of a filled and sealed dunnage bag 106 at the point of cargo shipping container destination by the operating circuit 150 is rendered particularly convenient through use of that feature. More specifically, and referring now to FIG. 17 of the application drawings wherein a housing packaging the operating circuit 150 is indicated generally at 176, it will be clear that the simple insertion as heretofore described of the apparatus wand assembly 48 through the opening 128 in the flapper valve assembly 120 to extend into the interior of a filled dunnage bag, and the manual operation of selector valve pushbutton assembly 157 to move the valve into the second operating position thereof of FIG. 14 B to draw air through supply line 154 to the right of the valve, rather than supply pressurized air through supply line 154, will be immediately effective to suck the air out of an inflated dunnage bag 106 and simply discharge the same to atmosphere as heretofore described, without requirement for manual flattening of the bag to force the air therefrom. When this is completed, the wand assembly 48 is simply withdrawn from the now deflated and flattened dunnage bag 106. As an alternative to the above, pump 152 may take the form of a rotary impeller pump driven by a reversible direction electric motor, and selector valve 155 eliminated from the operating circuit of FIG. 14, whereupon simple reversing of the pump drive motor will function to deflate the dunnage bag 106.

Safety of operation of pump 152 of the operating circuit 150 of FIG. 14 in the contexts of both the filling and deflation of dunnage bags 106 is provided for by a design feature of the pump which enables the same to be stalled or "dead headed" without pump motor burnout; thereby preventing damage to the pump drive motor in the event that the apparatus actuating pushbutton 160 is inadvertently depressed to supply pressurized air to the wand assembly 48 with the end of the same somehow blocked, and in the event that operation of the pump 152 with selector valve 152 in the second operating condition thereof to deflate a dunnage bag 106 is continued by failure to turn pump drive motor off after all of the air has been withdrawn from an operatively connected dunnage bag 106 to thus present a "dead headed" load to the pump.

Although dunnage bag inflation times may vary in accordance with the pressure of the supply air, it may be noted that with a supply air pressure of 25 PSIG as heretofore described with reference to the fluidic operating circuit 20 of the embodiment of our invention of application drawing FIG. 1, that the circuit is effective to fill approximately one cubic foot of dunnage bag volume in approximately 5 seconds, thus providing the apparatus operator with the capability of inflating a contemporary dunnage bag of representative 0.7 cubic foot volume in only approximately 3.5 seconds; it being here, in any event, reiterated that operation as described of the apparatus of our invention is independent of the volume(s) of the dunnage bag(s) to be filled thereby.

This is to say that the apparatus of our invention have the immediate capability, or "unit intelligence" as it may be termed, to fill arbitrary dunnage bag volumes to the same desired overpressure totally without regard for differences in those volumes.

A representative weight for the hand-held dunnage bag inflation apparatus of our invention is approximately one pound which, when combined with the ergonomic configuration thereof, virtually guarantees long periods of fatigue-free apparatus utilization by the apparatus operator; while a maximum operational noise level well below 50 dba upon discharge of the pressurized air to atmosphere following dunnage bag filling by the pneumatic apparatus embodiment of FIG. 1 virtually insures that no damage to the hearing of the apparatus operator will occur despite long periods of apparatus utilization.

Figure 18:
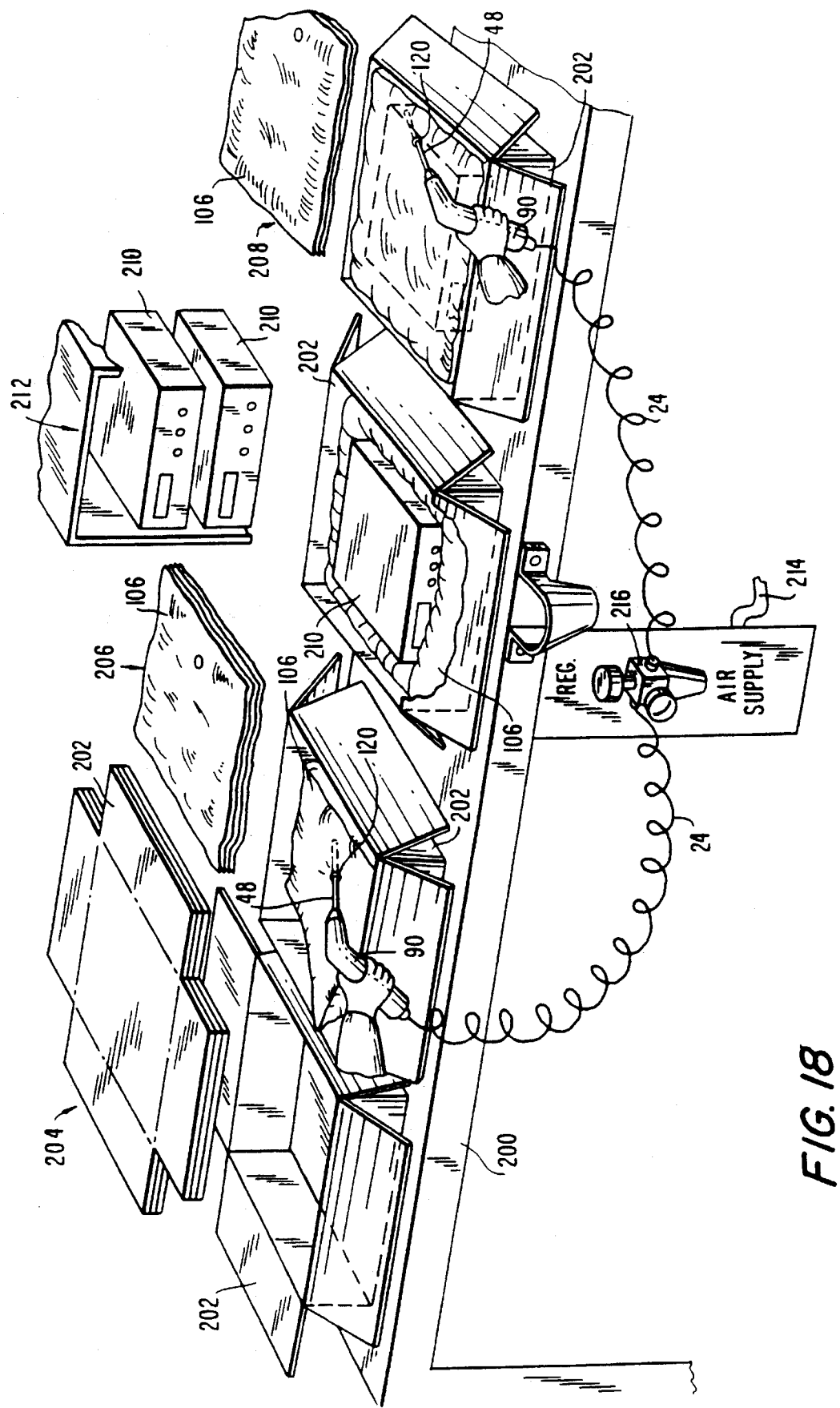
FIG. 18 is a perspective view, with parts cut away for purposes of illustration, illustrating a representative application of the apparatus and method of our invention to the sequential filling dunnage bags in situ for the protective packaging of shock sensitive cargo in cargo shipping containers in a typical industrial application.

Referring now to FIG. 18 of the application drawings which depicts a representative industrial application at a typical work station of the apparatus and method of our invention to the filling of dunnage bags in situ in cargo containers, a support table is indicated at 200 and has placed thereon a series of cargo containers, for example, cardboard boxes, as indicated at 202. An additional supply of the containers in unassembled form is indicated generally at 204; while spaced supplies of the uninflated dunnage bags 106 are indicated generally at 206 and 208, respectively. Shock-sensitive cargo, for example assembled electronic equipment, is indicated at 210, and a supply of the same indicated generally at 212 intermediate the respective dunnage bag supplies 206 and 208.

A source of pressurized air taking the form of the plant air supply is indicated at 214, and is appropriately regulated by a pressure regulator as indicated at 216, which is in turn connected as shown by line 24 to the housing 90 of the fluidic apparatus operating circuit 20 of the embodiment of FIG. 1 of the application drawings.

In use and following the shock sensitive cargo protective packaging sequence on the support table 200 as seen from left to right in FIG. 16, it will be seen that the operator removes an unassembled container 202 from supply 204, places the same on table 200, assembles the container, removes a first uninflated dunnage bag 106 from the supply 206 thereof and places the same in the assembled container 202. The wand 48 of the inflation apparatus housing 90 is then operatively inserted as shown into the dunnage bag fill valve 120 and the dunnage bag 106 filled to the desired overpressure as heretofore described, whereupon the wand 48 is removed therefrom; thereby leaving the filled dunnage bag 106, which is specifically predetermined to be somewhat oversized relative to the bottom wall of the container 202, to occupy that container bottom wall and extend upwardly as shown along the container side walls.

A piece of cargo 210 is then removed from the supply 212 thereof and placed atop the filled dunnage bag 106 in the container 202 to in essence nestle in the same.

A second uninflated dunnage bag 106 is then removed from the supply 108 thereof, placed atop the cargo 210 and filled first dunnage bag 106 in the container 202, and the apparatus wand 48 inserted into the fill valve 120 of the second dunnage bag to fill the same to the desired overpressure; whereupon the lid of the container 202 is closed and sealed, as by use of an appropriate adhesive tape from a roll thereof as indicated at 214, to complete the protective packaging of the cargo piece 210 in the container 202. Of course, this sequence is repeated as described until all pieces of the shock sensitive cargo 210 have been protectively packaged through use of the filled dunnage bags 106 in container 202.

Figure 19:
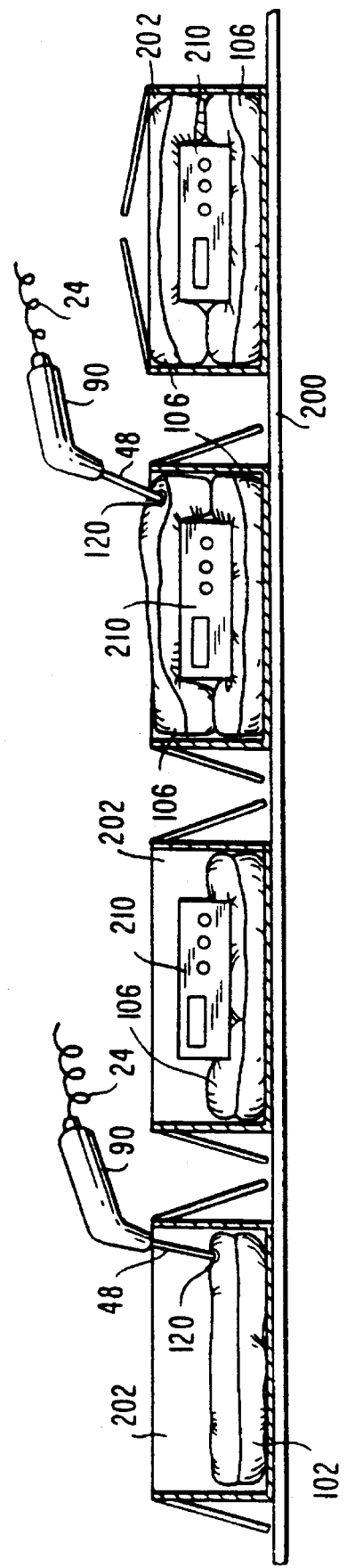
FIG. 19 is a perspective view, with parts cut away for purposes of illustration, further illustrating the sensitive cargo protective packaging sequence of FIG. 16.

FIG. 19 illustrates this same sequence of protective packaging of the shock sensitive cargo pieces 210 in the container 202, but as seen from the side with the relevant container wall cut away for purposes of illustration; and is included in the application drawings to make clear that, as a result of the oversizing of the filled dunnage bags 106 relative to the container 206 and cargo piece 210, the filled dunnage bags will completely overlap all sides of the cargo piece 210 within the container 206 to thus insure complete protection from shock damage of all four sides, as well as the top and bottom, of the protectively packaged cargo piece.

Various changes may of course be made in the hereindisclosed embodiments of the apparatus and method of our invention without departing from the spirit and scope thereof as defined in the appended claims.

What is claimed is:

1. A hand held inflating device for inflating bags comprising a housing sized to be hand held, said housing including a coaxial tube arrangement having an inner passage and outer annular passage;

a) said housing including means for supplying a source of 5 psig to 25 psig compressed air to one of said outer annular passage and said inner passage for bag inflation;

b) means for discontinuing supply of said compressed air when said bag is inflated to a desired pressure; said means for discontinuing including;

i) a pressure sensing device having two chambers separated by a diaphragm, the first chamber in communication with the other of said outer annular passage and said inner passage and the second chamber including an inlet in communication with said compressed air source, a venturi connecting said inlet and said second chamber, an outlet and a vent to atmosphere; and ii) wherein flow of said compressed air in said venturi causes a negative fluidic effect in said outlet and compressed air flow to said vent until said desired pressure is sensed in said first chamber whereby said diaphragm discontinues said negative fluidic effect; and iii) means operatively associated with said pressure sensing device responsive to discontinuation of said fluidic effect for stopping supply of said compressed air to said coaxial tube arrangement.

2. The hand held inflating device of claim 1 wherein said inner passage is adjustable with respect to said outer annular passage to adjust said desired pressure.

3. The hand held inflating device of claim 1, wherein said means for stopping is a piston cylinder assembly having a chamber in communication with said outlet, pressurization of said chamber driving a piston therein to block flow of said compressed air.

4. The hand held inflating device of 1 wherein said means for supplying includes a manual metering, power assisted, on-off switch/relief valve arranged between said coaxial tube arrangement and said source of compressed air.

5. The hand held inflating device of claim 4 further comprising a second pressure relief valve disposed between said source of compressed air and said coaxial tube arrangement.

6. The hand held inflating device of claim 1 wherein said means for supplying further comprises a coupling on said housing for connection to a remote source of said compressed air.

7. The hand held inflating device of claim 1 wherein said means for supplying said compressed air further comprises a pump for compressing ambient air, said means for stopping said supply of compressed air further comprising a pressure operated electrical switch which is in communication with said outlet and which controls operation of said pump, said pressure operated electrical switch terminating operation of said pump when said negative fluidic effect is discontinued to stop said supply of compressed air.

8. The hand held inflating device of claim 7 wherein said means for supplying said compressed air further comprises an on-off switch connected to said pressure operated electrical switch for on-off operation of said pump.

9. The hand held inflating device of claim 7 further comprising means for reversing flow of said compressed air in said coaxial tube arrangement which comprises a selector valve assembly which connects an inlet of said pump to said coaxial tube arrangement and connects an outlet of said pump to atmosphere so that said hand held inflating device can deflate a bag.

10. A method of filling bags using 5 psig to 25 psig compressed air comprising the steps of:

A) providing a housing sized to be hand held, said housing including a coaxial tube arrangement having an inner passage and outer annular passage;

i) said housing including means for supplying a source of 5 psig to 25 psig compressed air to one of said outer annular passage and said inner passage for bag inflation;

ii) means for discontinuing supply of said compressed air when said bag is inflated to a desired pressure; said means for discontinuing including;

a) a pressure sensing device having two chambers separated by a diaphragm, the first chamber in communication with the other of said outer annular passage and said inner passage and the second chamber including an inlet in communication with said compressed air source, a venturi connecting said inlet and said second chamber, an outlet and a vent to atmosphere; and b) wherein flow of said compressed air in said venturi causes a negative fluidic effect in said outlet and compressed air flow to said vent until said desired pressure is sensed in said first chamber whereby said diaphragm discontinues said negative fluidic effect; and c) means operatively associated with said pressure sensing device responsive to discontinuation of said fluidic effect for stopping supply of said compressed air to said coaxial tube arrangement:

B) inserting an end of said coaxial tube arrangement into a bag; and

C) inflating said bag to said desired pressure.

11. The method of claim 10 wherein said desired pressure ranges from 1" to 4" w.c. above atmospheric pressure.

12. The method of claim 10 wherein said bag is filled at a rate of 1 cubic foot per 5 seconds.

13. The method of claim 10 wherein said inner passage is adjustable with respect to said outer annular passage to adjust said desired pressure.

14. The method of claim 10 wherein said means for stopping is a piston cylinder assembly having a chamber in communication with said outlet, pressurization of said chamber driving a piston therein to block said flow.

15. The method of claim 10 wherein said means for supplying includes a manual, metering, power assisted on-off switch/relief valve arranged between said coaxial tube arrangement and said source of compressed air.

16. The method of claim 15 further comprising a second pressure relief valve disposed between said source of compressed air and said coaxial tube arrangement.

17. The method of claim 10 wherein said means for supplying further comprises a coupling on said housing for connection to a remote source of said compressed air.

18. The method of claim 10 wherein said means for supplying said compressed air further comprises a pump for compressing ambient air, said means for stopping said supply of compressed air further comprising a pressure operated electrical switch which is in communication with said outlet and which controls operation of said pump, said pressure operated electrical switch terminating operation of said pump when said negative fluidic effect is discontinued to stop said supply of compressed air.

19. The method of claim 18 wherein said means for supplying said compressed air further comprises an on-off switch connected to said pressure operated electrical switch for on-off operation of said pump.

20. The method of claim 18 further comprising means for reversing flow of said compressed air in said coaxial tube arrangement which comprises a selector valve assembly which connects an inlet of said pump to said coaxial tube arrangement and connects an outlet of said pump to atmosphere so that said hand held inflating device can deflate a bag.

* * * * *